United States Patent
Thachakkadu Mohan et al.

(10) Patent No.: US 11,983,541 B1
(45) Date of Patent: May 14, 2024

(54) OPERATION-SPECIFIC DEVICE CONFIGURATION

(71) Applicant: Lowe's Companies, Inc., Mooresville, NC (US)

(72) Inventors: Balajee Thachakkadu Mohan, Marietta, GA (US); Dheeraj Kysetti, Bengaluru (IN); Saravanan Rajendran, Chennai (IN); Vighnesh S Kumar, Kerala (IN)

(73) Assignee: Lowe's Companies, Inc., Mooresville, NC (US)

( * ) Notice: Subject to any disclaimer, the term of this patent is extended or adjusted under 35 U.S.C. 154(b) by 0 days.

(21) Appl. No.: 18/320,676

(22) Filed: May 19, 2023

(51) Int. Cl.
*G06F 9/4401* (2018.01)
*G06F 9/445* (2018.01)

(52) U.S. Cl.
CPC ........ *G06F 9/4411* (2013.01); *G06F 9/44505* (2013.01)

(58) Field of Classification Search
CPC .......................... G06F 9/4411; G06F 9/44505
See application file for complete search history.

(56) References Cited

U.S. PATENT DOCUMENTS

| | | | |
|---|---|---|---|
| 5,014,193 A | 5/1991 | Garner et al. | |
| 5,315,097 A * | 5/1994 | Collins, Jr. | ........ G06K 7/10881 235/455 |
| 5,494,136 A | 2/1996 | Humble | |
| 7,127,706 B2 | 10/2006 | Mason | |
| 7,607,581 B2 | 10/2009 | Kotlarsky et al. | |
| 7,617,391 B2 | 11/2009 | Rawe et al. | |
| 7,797,698 B2 | 9/2010 | Diament et al. | |
| 8,195,928 B2 * | 6/2012 | Rofougaran | ...... H04M 1/72409 713/1 |
| 8,302,108 B1 | 10/2012 | Hurren et al. | |
| 8,549,276 B2 | 10/2013 | Chen et al. | |
| 8,572,294 B2 | 10/2013 | Chisholm | |
| 9,275,382 B2 | 3/2016 | Dubois et al. | |
| 9,298,479 B2 | 3/2016 | Anson | |
| 9,455,877 B2 | 9/2016 | Wolff-Petersen | |
| 9,524,199 B2 | 12/2016 | Liu et al. | |
| 10,019,247 B2 | 7/2018 | Bourke | |
| 10,074,083 B2 | 9/2018 | Westby et al. | |
| 10,115,096 B2 | 10/2018 | Bostwick | |
| 10,216,281 B2 | 2/2019 | Beatty et al. | |

(Continued)

FOREIGN PATENT DOCUMENTS

EP 2995225 B1 8/2018

OTHER PUBLICATIONS

"Element SSK-E", Available online at: elementpos.co, Jun. 14, 2021, 2 pages.

(Continued)

*Primary Examiner* — Zahid Choudhury
(74) *Attorney, Agent, or Firm* — Kilpatrick Townsend & Stockton LLP

(57) ABSTRACT

Methods, systems, and apparatuses for configuring a device for a specific task or set of tasks thereby allowing the device to be used for more than one task or set of tasks while also enabling fine-grain control over how the device may be used. A device's file system can operate with a particular file system based on the task(s) that the device will perform. Further, the device can physically configure itself based on the task(s) that the device will perform.

20 Claims, 21 Drawing Sheets

(56) References Cited

U.S. PATENT DOCUMENTS

| | | | |
|---|---|---|---|
| 10,228,830 B2 | 3/2019 | Hou et al. | |
| 10,324,731 B2 | 6/2019 | Liu | |
| 10,536,350 B2 | 1/2020 | Myneni et al. | |
| 10,592,886 B2 | 3/2020 | Sanchez-llorens et al. | |
| 10,775,962 B2 | 9/2020 | Smoak et al. | |
| 11,397,588 B2 | 7/2022 | Hudson et al. | |
| 11,416,839 B2 | 8/2022 | Uchimura et al. | |
| 2004/0193867 A1* | 9/2004 | Zimmer | G06F 9/4416 713/2 |
| 2007/0099706 A1 | 5/2007 | Nuta et al. | |
| 2011/0016301 A1* | 1/2011 | Galicia | G06F 9/461 713/2 |
| 2013/0054812 A1 | 2/2013 | Decoteau | |
| 2014/0108972 A1 | 4/2014 | Teti et al. | |
| 2015/0220737 A1* | 8/2015 | Rothman | G06F 21/572 726/1 |
| 2015/0234678 A1* | 8/2015 | Kim | G06F 9/4843 718/102 |
| 2015/0324209 A1* | 11/2015 | Hsu | G06F 9/441 713/2 |
| 2016/0124751 A1* | 5/2016 | Li | G06F 21/74 713/100 |
| 2016/0179553 A1* | 6/2016 | Sliwa | G06F 9/45541 713/2 |
| 2017/0277561 A1* | 9/2017 | Zhong | G06F 9/5044 |
| 2021/0034376 A1* | 2/2021 | Kalla | G06F 9/4416 |
| 2021/0064140 A1 | 3/2021 | Egan et al. | |
| 2021/0304174 A1 | 9/2021 | Suzuki | |
| 2021/0326147 A1 | 10/2021 | Shelton et al. | |
| 2021/0398098 A1 | 12/2021 | Narusawa | |
| 2022/0350616 A1 | 11/2022 | Singh et al. | |

OTHER PUBLICATIONS

"Expanse", Available online at: https://kiosk.com/, Oct. 29, 2020, 6 pages.

Savidis, "Dynamic Software Assembly for Automatic Deployment-oriented Adaptation", Electronic Notes in Theoretical Computer Science, vol. 127, Issue 3, Apr. 11, 2005, pp. 207-217.

* cited by examiner

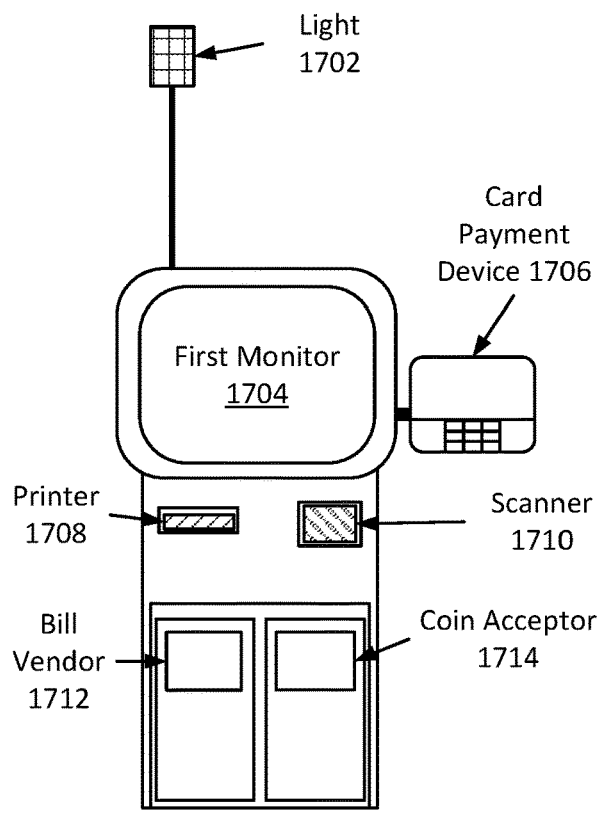
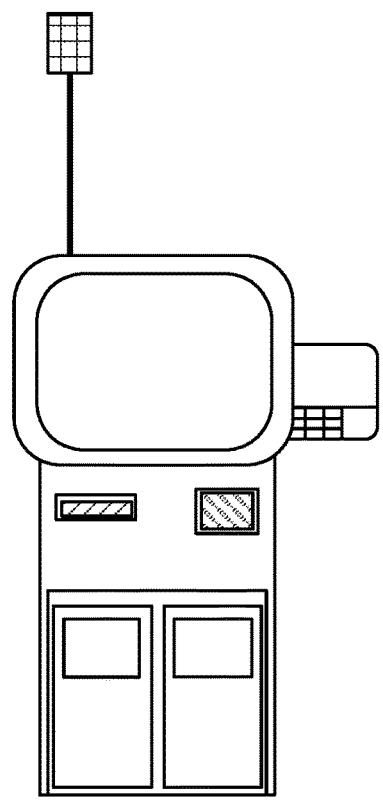
FIG. 17A  FIG. 17B
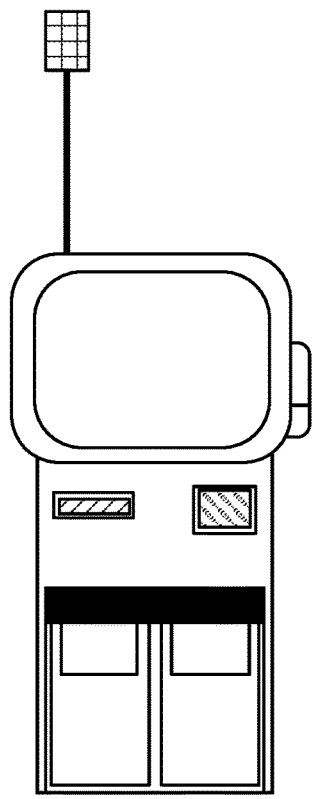
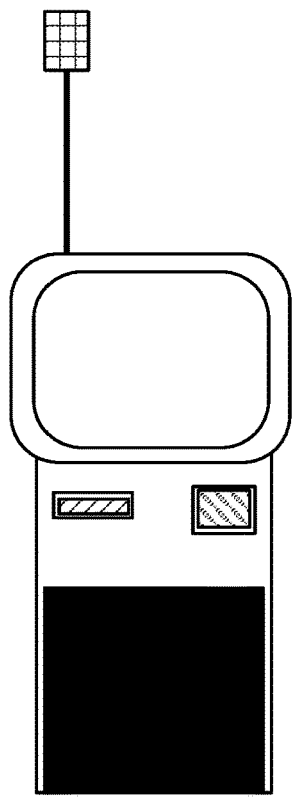
FIG. 17C  FIG. 17D

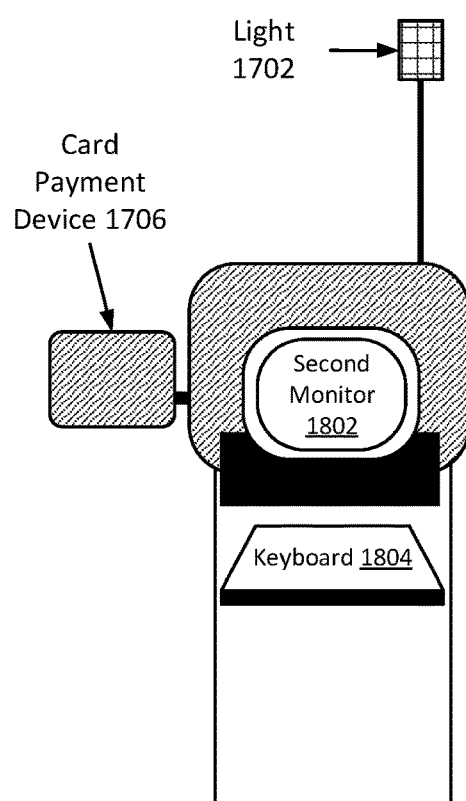
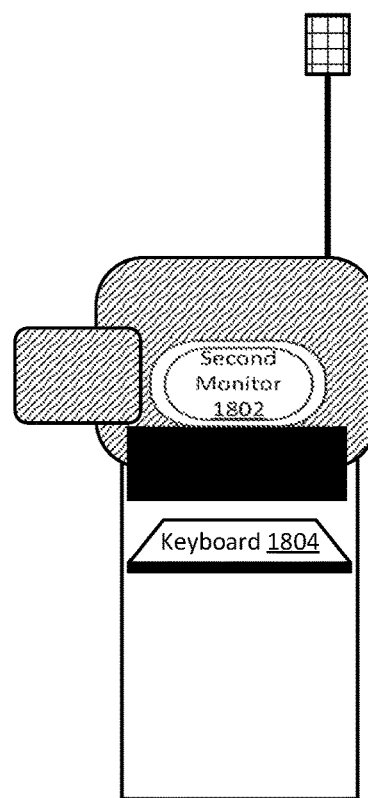
FIG. 18A
FIG. 18B
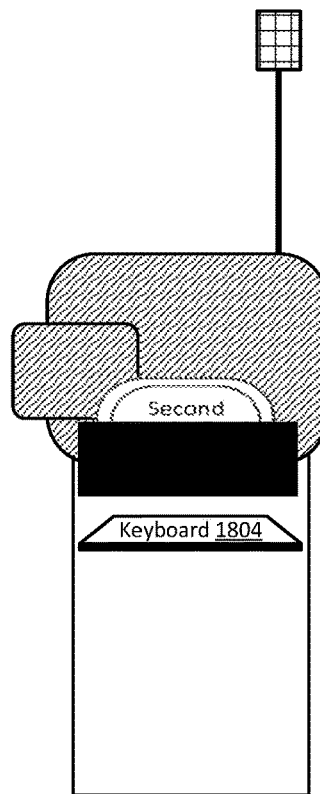
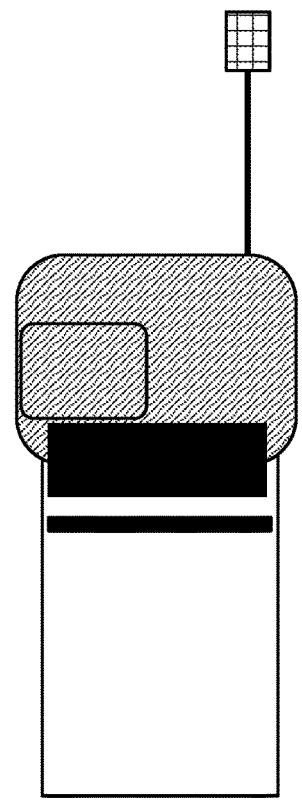
FIG. 18C
FIG. 18D

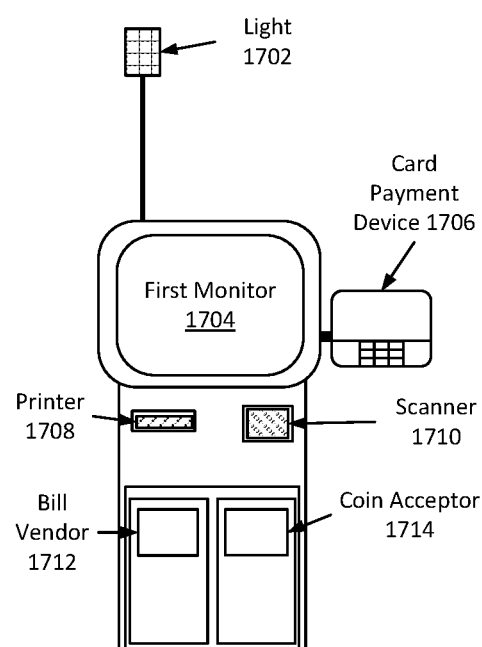 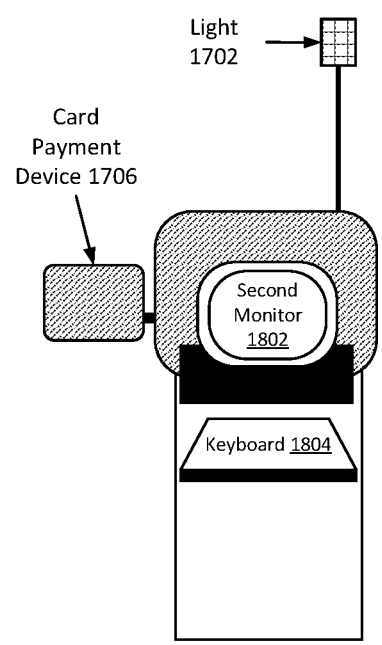
*FIG. 20A*  *FIG. 20B*

OPERATION-SPECIFIC DEVICE CONFIGURATION

BACKGROUND

Devices are often designed to perform a certain operation and are designed with only the components that are necessary to carry out the certain operation they were designed for. Thus, devices may be designed with hardware and software with little to no configuration capabilities. As such, a first device may be designed for use in a way that is different from a second device and the first device could not perform the operations that the second device is designed to carry out.

Since devices are created with a single purpose in mind, the software and hardware of the device are only able to be used to accomplish a single task (e.g., price checking). Such devices may not always be used, be under-utilized, take up valuable retail space, lead to increased costs for the owners of the various devices, lead to manufacturing complexity, expose system vulnerabilities, and/or result in wasted computing resources.

Embodiments of the disclosure address these problems and other problems individually and collectively.

BRIEF SUMMARY

Embodiments of the present invention may allow for devices to be configured for a specific task or set of tasks thereby allowing a single device to be used for more than one task or set of tasks while also enabling fine-grain control over how the device may be used. Embodiments cause a device's file system to operate with a particular file system based on the task(s) that the device will perform. Further, embodiments cause the device to physically configure itself based on the task(s) that the device will perform.

One embodiment of the invention comprises a method that includes sending, to a server, a request associated with inquiring the server about an operational mode in which the device is to be operated, wherein the operational mode is one of a plurality of operational modes each corresponding to a respective set of software layers that controls a physical configuration of the device and allows operations of the device according to the physical configuration. The method additionally includes receiving, from the server, an indication of the operational mode, determining a set of software layers corresponding to the operational mode, assembling the set of software layers to define a file system, and initializing a runtime environment that uses the file system.

Another embodiment of the invention comprises a device comprising: a housing; a hardware peripheral coupled to the housing and being operable in a plurality of configuration states that include (i) a first configuration state that allows a user interaction with the hardware peripheral and (ii) a second configuration state that prevents any user interaction with the hardware peripheral; one or more processors; and one or more memory storing instructions. Upon execution by the one or more processors, the instruction(s) configure the device to: determine, based on a file system used to boot up the device, an operational mode of the device, wherein the operational mode corresponds to the file system; determine, based on the operational mode, a configuration state in which the hardware peripheral is to be operated, wherein the configuration state is one of the plurality of configuration states; and cause a device configuration according to the configuration state.

These and other embodiments are described in further detail below.

BRIEF DESCRIPTION OF THE DRAWINGS

FIGS. 17A-D illustrate an example change in peripheral positioning when booted into an operational mode, according to an embodiment of the present invention.

FIGS. 18A-D illustrate an example change in peripheral positioning when booted into an operational mode, according to an embodiment of the present invention.

FIGS. 20A-B illustrate an example peripheral positioning when booted into an operational mode, according to an embodiment of the present invention.

DETAILED DESCRIPTION

Figure 1:
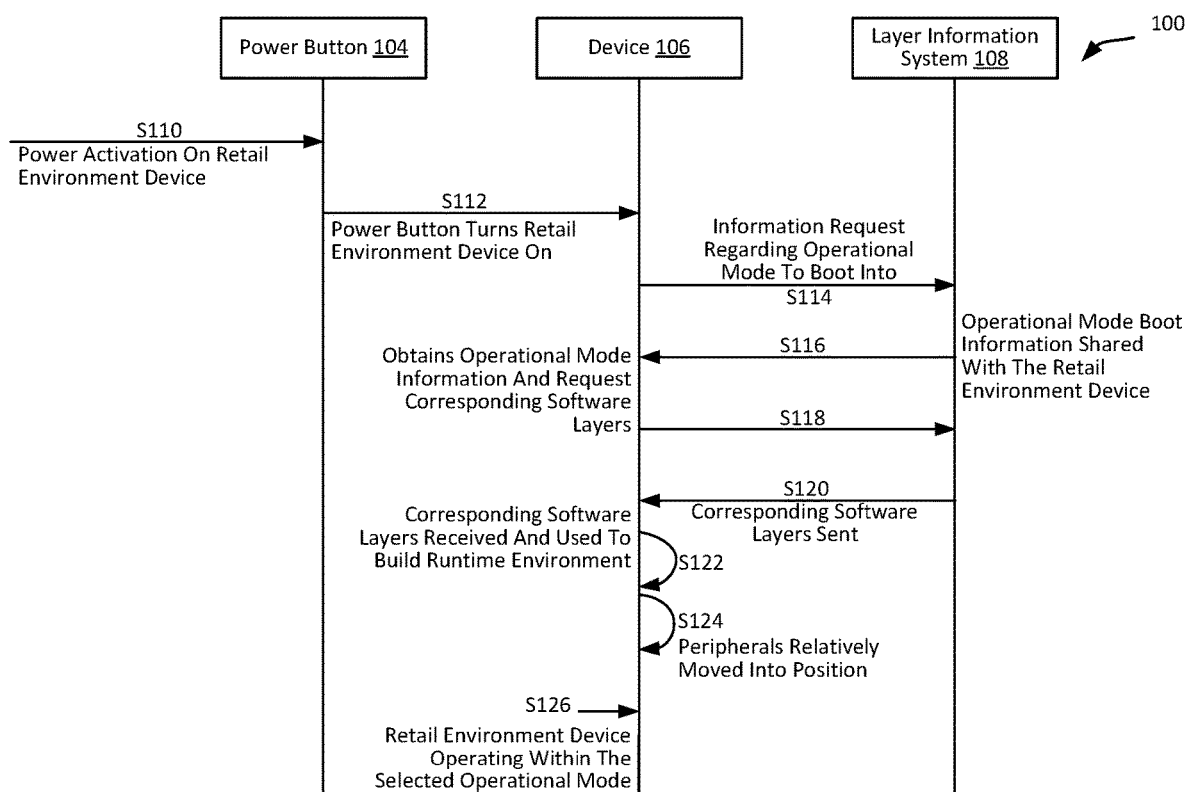
FIG. 1 illustrates a system according to an embodiment of the present invention.

Embodiments include methods and systems for configuring devices for operating within an indicated operational mode. Thus, the device may have the potential to operate in more than one operational mode but be controlled in a way that allows for the device to potentially carry out only a subset of the total potential operational modes at a given time.

Solutions described herein are capable of allowing a device to be configured on the fly/dynamically (e.g., during bootup) to customize the abilities of the device. By doing so, such a device may be better utilized, save space in the environment it is located within (e.g., retail environment), reduce costs for owners of the device and/or a space, reduce manufacturing complexity, increase safety of a system, and save resources.

The safety of the system is capable of being increased for several reasons. First, system security is increased in embodiments where file system layers are loaded from a repository or protected local memory. As an example, if a malicious actor has gained control of a device (whether with remote access or physical access), shutting the device down is capable of sufficiently resetting the file system of the device back into a state that is not compromised by the malicious actor because layers of the file system may be reloaded upon each bootup of the device. Further, system security may be enhanced by keeping certain peripherals from being interacted with when a device is not assigned a corresponding operational mode. For example, a keyboard may be communicatively couple to the device and exposed so that keystrokes may be typed, however, embodiments may allow for the keystrokes to effectively not be received by the device when the file system is not configured to receive such input from the keyboard.

Some embodiments that are described in more detail below are capable of loading an indicated file system to a file system of a device to be used during the operations of the device. The file system may allow for the device to carry out certain programmed actions and/or physical actions. Further, the file system may cause the device to physically morph. By physically morphing a device, the device may then have some hardware components exposed to a user, hidden from a user, presented to a first user instead of a second user, etc. Explanations for aspects of the embodiments described herein may be broken down into software actions and hardware actions.

Some terms used throughout the application may be defined as follows.

A "device" may be a computing device adapted for a particular purpose. For example, a device may be a retail environment device because it is designed to be used in a retail environment. For purposes of the present application, a retail environment device is a type of device. A device may be adapted for the purpose of being configured to switch between operational modes and morph device peripherals (hardware) and/or software according to the operational mode.

A "peripheral" may be a device component that is capable of connecting to a processing unit of a device to provide additional functionality and/or input (and/or output) capabilities. In some cases, peripherals are able to be plugged into a device so that they may be communicatively coupled with the processing unit of the device, but may also be wirelessly communicatively coupled with the device. Further, although some peripherals are external and/or auxiliary to a device, peripherals may also be embedded within the same housing that includes the processing unit. Broadly, peripherals may include storage devices, output devices, input devices, and storage devices. Some examples of peripherals may be: a keyboard, a touchscreen, a button, dial, a number pad, a coin recycler, a coin vendor, a coin acceptor, a bill recycler, a bill vendor, a bill acceptor, a signature capture device, a PIN entry device, an NFC reader, a cash drawer, a card reader, a barcode scanner, a QR code scanner, a monitor, a speaker, a check reader, a microphone, a camera, a receipt printer, a display pole, or a light.

An "operational mode" may define a specific configuration in which a system, device, and/or software is configured to operate. An operational mode may correspond to behavior, functionality, and/or capabilities of a system, device, and/or software. Some example of operational modes may be an "Information Kiosk" mode, a "Non-Assisted Business" mode, and an "Assisted Business" mode. Such modes may cause software, systems, and/or devices to be configured according to the operational mode that is being operated with. In a context of a retail environment, an "Information Kiosk" mode may allow a device to be interacted with to obtain information (e.g., pricing of an item), thus such mode may not require payment peripherals. In a context of a retail environment, a "Non-Assisted Business" mode may allow a device to be interacted with to conduct business transactions (e.g., buy items), thus, such mode may require the use of barcode scanning and payment peripherals. In a context of a retail environment, an "Assisted Business" mode may allow a multiple users of a device to interact with a device to conduct business transactions (e.g., a cashier employee and an item purchases), thus, such mode may require the use of barcode scanning, payment peripherals, and a distinct user interface.

A "layer" may represent a logical division of responsibilities or services within a file system. A layer may be a compressed file system and may be created in isolation from any other layer. A layer may include all dependencies, so that the software included within the layer may run reliably. Each layer may have an isolated functionality packaged within itself, which could control the software interactions and hardware movements. Layers may be referred to as modules or containers. As an example, software may be included with in a layer relating to the operation, control, and/or movement of a keyboard peripheral.

First, a high-level interaction between system components is described below.

FIG. 1 illustrates a system according to an embodiment of the present invention. System 100 a power button 104, a device 106 (e.g., retail environment device, point of sale device, etc.), and a layer information system 108. Generally, in an embodiment, powering on of the device 106 may occur (e.g., due to pressing of a power button 104), causing the device 106 to obtain operational mode (e.g., persona) layers from the layer information system 108, and further causing the device 106 to bootup using the obtained layers and operate with the obtained layers.

At step 110, power activation of a device (e.g., retail environment device) occurs. Power may be activated by a power button 104, a switch, etc.

During the boot up of the device 106, in step 114, the device 106 may request information from the layer information system 108 regarding an operational mode (e.g., persona) to boot with.

At step 116, the layer information system 108 may then send the operational mode information to boot with to the device 106, causing the device 106 to obtain the requested operational mode information. The operational mode information may then further allow the device 106 to request additional information from the layer information system 108, such as requesting the corresponding software layers for the obtained operational mode information in step 118. In step 120, the layer information system 108 may then send software layers to the device 106 that correspond to the operational mode that is associated with the device 106.

At step 122, the corresponding software layers are received from the layer information system 108 by the device 106 and the software layers are used by the device 106 to build a runtime environment. After a runtime environment has been built, peripherals of the device 106 may be caused to move at step 124 based on the assembled runtime environment.

At step 126, after the runtime environment has been assembled and any peripherals have been moved as needed, the device 106 may then finish the boot process and be in an active state where the device may carry out operations in accordance with the operational mode the device 106 was booted with.

Using an easily understood and relatable scenario as an example, in an embodiment, a device may be in a retail environment (e.g., a grocery store). The device may be booted up, operate, and be used in a first operational mode due to an employee of the grocery store authenticating to a server and assigning the operational mode to the device, causing the device to be booted with the assigned first operational mode. The first operational mode may allow the device to have a cashier operator to help check customers out with the items the customer is purchasing, therefore, a cash drawer may be unlocked for use by the cashier employee. The same device may be rebooted later in the same day and operate in a second operational mode based on the assigned operational mode being reconfigured remotely from the device. The second operational mode may allow for the device to be used as a self-checkout register that only accepts card payments (the cash drawer should not be accessible). Each operational mode of the device may include a specific combination of software used by the device to carry out its operational mode. Further, each operational mode may result in the device being physically configured in a specific way (e.g., the cash drawer being unlocked).

Some benefits of the software configuration, hardware configuration, and methods of assembling the file system for a device resulting from the assigned operational mode is that system security may be enhanced. The security may be enhanced because the operational mode of the device may be determined remotely from the device. In such a case, the device may be less prone to being used in an unauthorized manner because a customer would not be able to control the operational mode and thereby not gave access and/or control over certain hardware of the device. Thus, the device could not be used in an operational mode not within the device's file system. Further, if a device has a software compromise, the exploited software may be removed by merely rebooting the device. Additionally, a customer may not have the ability to cause a device to be operational without access to a remote server. Further benefits are possible and described throughout.

Further embodiments and details thereof are described below. Explanations for aspects of the embodiments described herein may be broken down into software behavior and hardware behavior.

I. Software Behavior

Software layers may be assembled and cause a device to operate in accordance with an operational mode. Software layers may be assembled during the bootup of the device to reduce the chance system vulnerabilities and/or exploits.

During the bootup process of a device, software layers may be loaded into the file system of a device based on an operational mode assigned to the device. The device may then operate a runtime environment according to the operational mode (meaning that the peripherals and functionality are enabled and/or morphed in accordance with the assigned operational mode). When the device begins a power down process, the layers may optionally be removed from the device so that when the device is off, layers obtained from a layer repository are no longer in the file system. Such layer removal may result in the same or different layers being loaded into the file system to create a runtime environment the next time a device begins a boot process (e.g., is turned on).

Such lifecycle of loading, using, and removing software from the device is described in more detail below and may provide benefits such as enhanced system security.

A. Before Bootup

Figure 2:
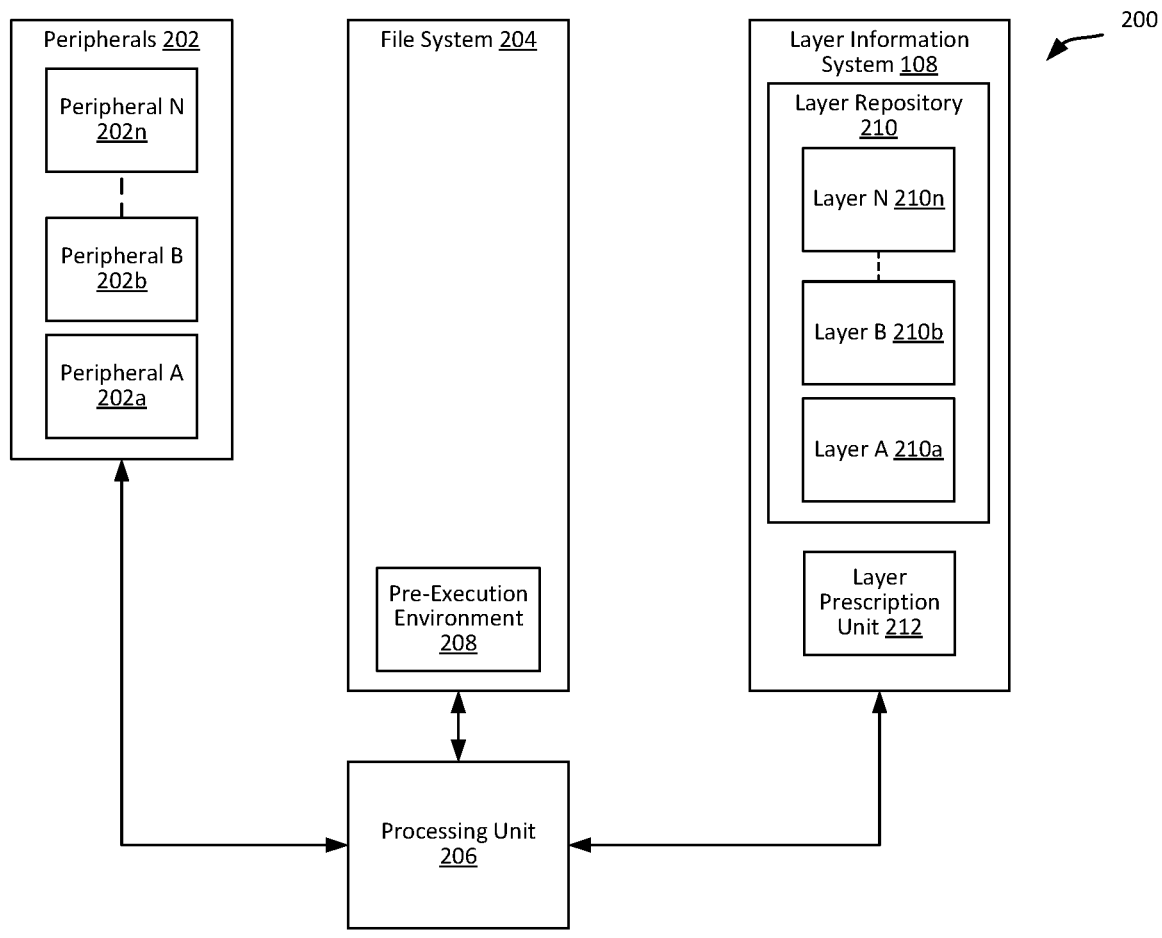
FIG. 2 illustrates a system according to an embodiment of the present invention.

FIG. 2 illustrates a system according to an embodiment of the present invention. System 200 illustrates how the processing unit 206 relates to other components of the system. The processing unit 206 may communicate with subsystems of the device (e.g., one or more peripherals 202, a file system 204, a layer information system 108) and control the execution of a plurality of instructions from the file system 204 and/or the layer information system 108, as well as the exchange of information between subsystems.

A processor of a device may be communicatively coupled to one or more peripherals 202 via the processing unit 206. The peripherals 202 may allow for the device to obtain input for the device and/or produce output from the device (e.g., to and from users). The capability of a device to be configured with one or more peripherals 202 is depicted by the listing of peripheral A 202*a*, peripheral B 202*b*, and peripheral N 202*n*. Such listing is representative that the peripherals 202 may include one or more peripherals. The communicative coupling between the peripherals 202 and the processing unit 206 allows for communications to be sent to and/or from the peripherals 202 that relate to a peripheral's received input, or an output for a peripheral to present.

The processing unit 206 may also be communicatively coupled to a file system 204. A file system 204 may allocate space in memory and may be responsible for organizing files (e.g., compressed file systems), and/or directories. The file system 204 may include information about layer size, layer name, layer location, how layer data may be accessed, etc.

Before booting of the device, a portion of the file system 204, which may be referred to as a pre-execution environment 208, may be stored in non-volatile memory of the device or stored in non-volatile memory that is remote from the device. As an example, the pre-execution environment 208 may be stored in non-volatile memory of the device such as a solid-state drive or hard disk drive and may be used without first needing to make a network call. Such a configuration may allow for the boot process to occur more quickly than if a network call was needed to obtain the pre-execution environment 208. As another example, the non-volatile memory is remote to the device and the device must make a network call to obtain a pre-execution environment 208 (e.g., a networking boot program is obtained via network booting). The pre-execution environment 208 obtained from the network booting may then be saved into volatile memory of the device so that the pre-execution environment 208 may be used to subsequently carry out further steps of the boot process but would then also ensure that the pre-execution environment is removed from memory of the device upon device shutdown. In an embodiment where the pre-execution environment 208 is loaded into volatile memory of the device, system security is increased, at least due the possibility of corruption of the pre-execution environment 208 being drastically reduced or eliminated. The pre-execution environment 208 is executed during the boot process of the device and gives the device the capability to communicate with a layer information system 108 to obtain one or more layers to be included in the file system 204 of the device. The obtained one or more layers then become part of the file system 204. More details relating to what the pre-execution environment 208 may be configured to do is explained in further detail below (e.g., when explaining the boot process).

The processing unit 206 may also be communicatively coupled to a layer information system 108. The layer information system 108 may be local to the device, may be remote to the device, or a combination thereof. The layer information system 108 may include a layer repository 210 and a layer prescription unit 212. Further, the layer prescription unit 212 and the layer repository 210 may not be located on the same device as one another (e.g., the layers prescription unit 212 may be local and/or remote to the device while the layer repository 210 is remote and/or local to the device). Further, the layer information system 108 may be remote to the device which includes the file system 204.

The layer prescription unit 212 may include one or more prescriptions for a device (e.g., retail environment device, point of sales device). A prescription for the device is capable of communicating to the device an operational mode that the device is associated with. In other words, the layer prescription unit 212 may contain one or more operational mode prescriptions for the device, each of the one or more operational mode prescriptions are capable of causing the device to perform a boot process according to a respective prescribed operational mode and thereby enter a runtime environment in accordance with the prescribed operation mode. Once the device receives a prescription from the layer prescription unit 212, the device may then use the prescription to obtain one or more layers from the layer repository 210 that correspond to the operational mode prescription.

In an embodiment, the layer prescription unit 212 may be configurable when the device is not turned on (e.g., the layer prescription unit 212 is operating on a separate system from the file system 204 such as a server that is remote to the device, the layer prescription unit 212 is stored in removable memory of the device, etc.). In an embodiment, the layer prescription unit 212 is capable of being managed by personnel associated with the location that the device is located at. Thus, the layer prescription unit 212 may be capable of determining which layers are sent to a file system 204. For example, the layer prescription unit 212 may contain an operational mode association to each device so that once a device runs and/or requests the pre-execution environment 208, the layer prescription unit 212 is capable of recognizing the device that is booting up and determining which operational mode the device should boot into.

More details relating to what the layer prescription unit 212 may be configured to do is explained in further detail below (e.g., when explaining the boot process).

The layer repository 210 may include one or more layers (sometimes referred to as "modules" or "containers"). Each layer may be a compressed file system and may be created in isolation from any other layer in the layer repository 210. In an embodiment, a layer (e.g., Layer A 210a) is compressed and created with all necessary applications installed and preconfigured for use. That is to say, each layer may behave like a software container that packages up code and all of the dependencies so that applications may run reliably from one computing environment to another. A layer may be capable of isolating the software associated with the layer from its environment to ensure that it runs uniformly, regardless of system infrastructure (e.g., what other layers are running on a device from the file system). Each layer may have an isolated functionality packaged within itself, which could control the software interactions and hardware movements. Thus, a layer may give the capability for one or more peripherals 202 to be controlled. Further, the layer repository 210 may be distributed. The layer repository 210 may be accessible from the device (e.g., stored in memory of the device, stored on a remote server). The layer repository 210 is capable of sending one or more layers to the file system 204, which may allow for the runtime environment of a device to be influenced by the layers included in the file system 204.

The capability of the layer repository to include one or more layers is depicted by the listing of layer A 210a, layer B 210b, and layer N 210n. Such listing is representative that the layer repository 210 may include one or more layers. The communicative coupling between the layer repository 210 and the processing unit 206 allows for communications to be sent to and/or from the layer repository 210 that relate to layers to be used by the file system 204 according to an operational mode assigned to the device (e.g., retail environment device) where the processing unit 206 resides.

In an embodiment, the layer repository 210 may be configurable when the device is not turned on (e.g., the layer repository 210 is operating on a separate system from the file system 204 such as a server that is remote to the device). In an embodiment, the layer repository 210 is capable of being managed by personnel associated with the location that the device is located at and/or third-party personnel. In an embodiment, the layers of a layer repository 210 may be updated with new versions periodically, such new versions of the layers may then be caused to be loaded into the file system 204 of a device once the device loads the layers (e.g., when the device begins a boot process). In an embodiment, the layer repository 210 is located within a non-volatile memory of the device (e.g., thumb drive, hard drive) that is separate from the memory that stores the file system 204.

B. During Bootup

The bootup process may be initiated by a power button of a device being pressed or sending a signal from a separate device which causes the device (e.g., retail environment device) to become powered on. In some embodiments, the power button of the device may only be exposed when the device is powered off, may be behind a locked door, and/or may cause the device to look for a two-factor authentication condition, etc. Such measures may help prevent an unauthorized person from turning the device on and/or off.

When the device becomes powered on, the boot process transitions into a pre-execution environment where an in-memory process dynamically assembles the runtime environment of the device. In other words, once a device is powered on, a pre-execution environment of a file system is executed which causes layers to be obtained from a layer information system and may also cause a configuration of peripherals.

Figure 3:
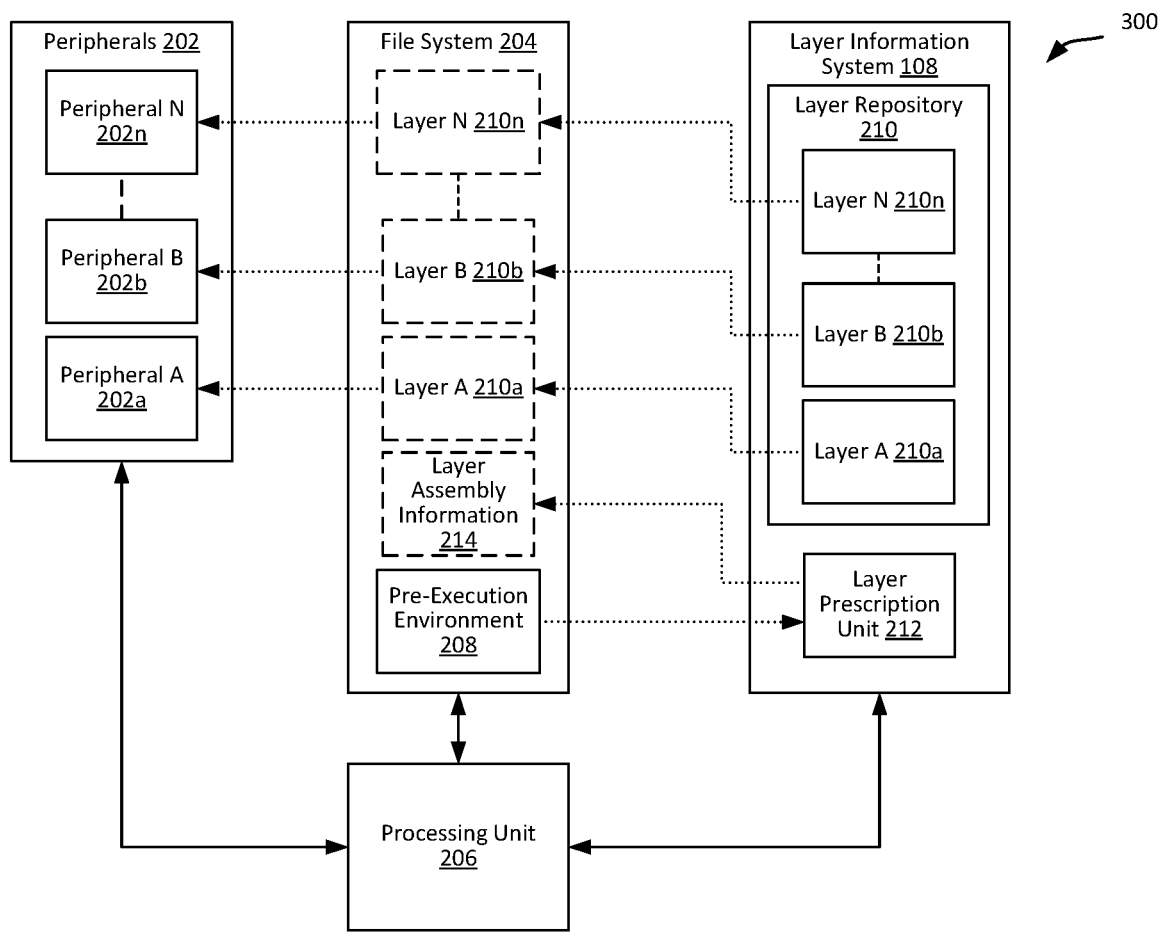
FIG. 3 illustrates a system according to an embodiment of the present invention.

FIG. 3 illustrates a system according to an embodiment of the present invention. System 300 illustrates how layers may be obtained by the file system 204 from the layer information system 108, and how the file system 204 may cause peripherals 202 to be configured.

Upon a device being powered on, the pre-execution environment 208 is executed. As mentioned above, the pre-execution environment 208 may have been received via a local memory request or a network request to remote memory. The pre-execution environment 208 may cause a layer prescription unit 212 to send a layer prescription to a file system 204. The layer prescription may include layer assembly information 214. The layer assembly information 214 may include information regarding which layers will be included in the file system 204 so that the device may operate in accordance with a specific operational mode. In an embodiment, the layer assembly information 214 may include a list of layers that the file system 204 may then need to respectively request that the layer repository 210 send to the file system 204. In an embodiment, the layer assembly information 214 includes an identifier which identifies an operational mode assigned to the device and is capable of identifying the layers that should be loaded into the file system 204 of the device (e.g., the identifier may be associated with "operational mode one" and cause all layers related to "operational mode one" to be loaded into the file system 204 from the layer repository 210).

In an embodiment, once the layer prescription unit 212 is caused to be communicated with due to the running of the pre-execution environment 208, the layer assembly information 214 and the layers are caused to be sent to the file system 204 by the layer information system 108. In an embodiment, the layer assembly information 214 is not sent to the file system 204 by the layer prescription unit 212, but the layers are still sent to the file system 204 by the layer information system 108. In an embodiment, the pre-execution environment 208 may be capable of determining which layers should be received from the layer repository 210 without requesting information from the layer prescription unit 212 (e.g., input from the device during bootup of the device is capable of determining the operational mode to boot the device into) and therefore the pre-execution environment 208 may cause the layer repository 210 to send layers to the file system 204 without first communicating with a layer prescription unit 212.

The file system 204 is capable of obtaining layers as part of the boot process. As mentioned above, the file system 204 is capable of obtaining the layers from the layer information system 108 layer repository 210. The layers that the file system 204 receives may be dependent upon the operational mode that is associated with the device. The operational mode may be associated with the device due to input at the device (e.g., retail environment device) or may be associated with the device due to information stored within the layer information system 108 layer prescription unit 212.

In an embodiment, after the pre-execution environment 208 begins, the layer prescription unit 212 is caused to send an operation mode identifier to the device in the form of layer assembly information 214. The layer assembly information 214 may be capable of allowing the file system 204 to request individual layers from the layer repository 210. In such a case, the layer assembly information 214 may act as a list of layers that the file system 204 will then request from the layer repository 210 via the processing unit 206.

The layer assembly information 214 may be capable of allowing the file system 204 to share with the layer repository 210 the layer assembly information 214 so that the layer repository 210 is able to determine the corresponding layers to be sent to the file system 204.

The layer assembly information 214 may include information that allows the file system 204 to determine particular layer configuration information to configure layers for specific tasks with. For example, Layer A 210a may be used to boot a device into an "Informational Kiosk" mode and into an "Assisted Business" mode, but the layer A 210a may be configured to cause a peripheral (e.g., peripheral 202a) to have a different user interface. Thus, the layer assembly information 214 is capable of including more than the information needed to know which layers will be included in the file system 204 during runtime, but may also be used to determine the configurations of each layer for the runtime operational mode. More detail pertaining to runtime software configurations is included in a below section.

Additionally, because the layers are self-contained, the layers may be loaded into the file system 204 independently of the other layers. Thus, the layer repository 210 layers are capable of being loaded in parallel with one or more other layer repository 210 layers and are capable of being loaded in any order.

The layers within the file system 204 are capable of causing the peripherals 202 to be configured based on the layers, configuration of the layers, and/or operational mode. Each layer of the file system 204 is responsible for separate and isolated functionality of the device compared to the other layers in the file system 204, allowing the layers to determine relative movement of respective peripherals 202 and the communicative coupling of respective peripherals 202. Thus, a first software layer may serve a first function and a second software layer may server a second function.

Further, in an embodiment, a layer may allow at least one of: the one or more processors to process interaction (e.g., user interaction) with a hardware peripheral of the device, the hardware peripheral to be moved relative to a housing of the device, or a user interface of the hardware peripheral to present a set of elements.

Figure 4:
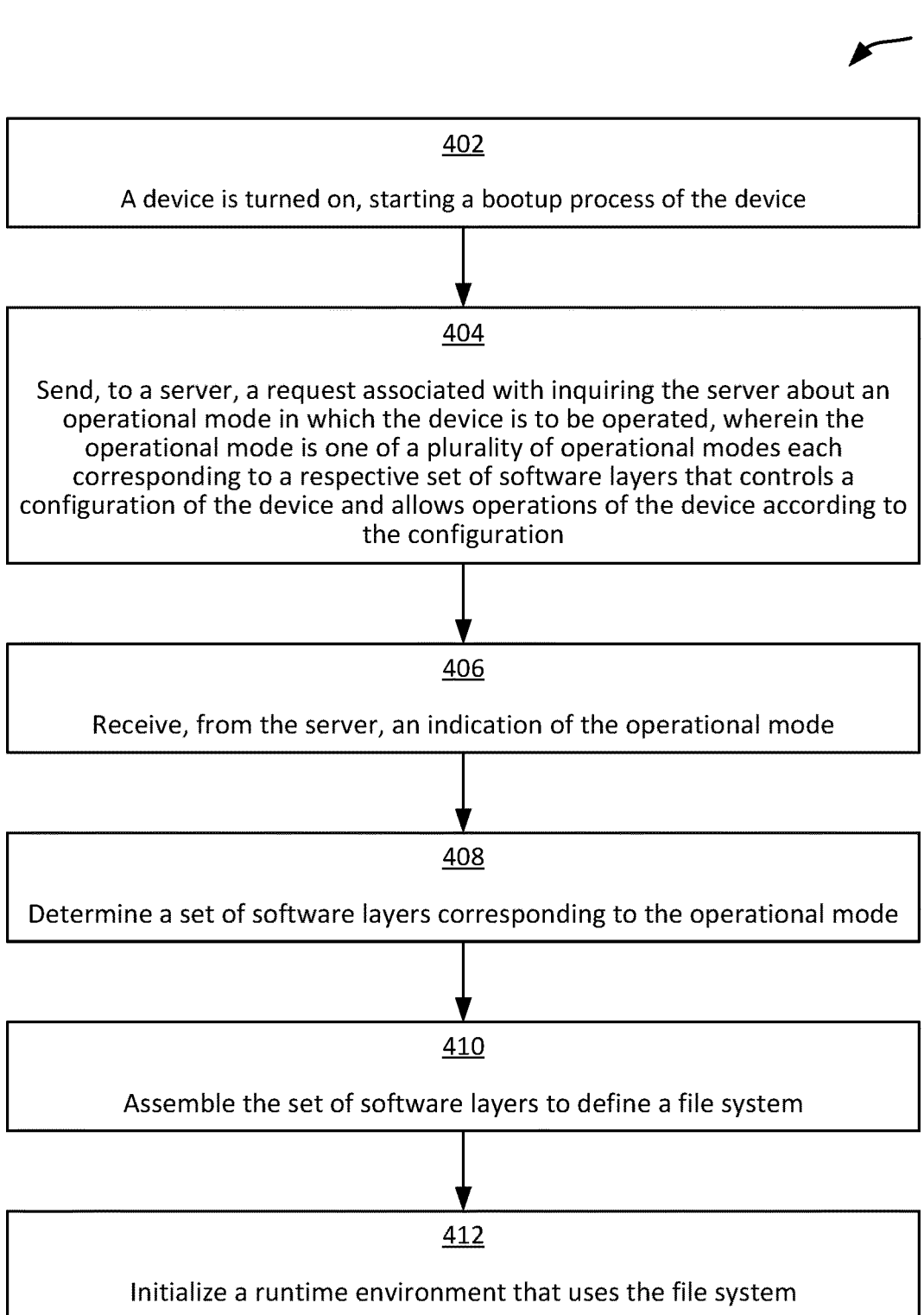
FIG. 4 illustrates a method of booting a device according to an embodiment of the present invention.

FIG. 4 illustrates a method of booting a device according to an embodiment of the present invention. Method 400 may relate to some of the embodiments described with respect to system 300.

At step 402, a device is turned on, starting a bootup process of the device (e.g., running a pre-execution environment).

At step 404, a request is sent to a server by a device. The request may be associated with inquiring the server about an operational mode in which the device is to be operated. The operational mode may be one of a plurality of operation modes, where each operational mode corresponds to a respective set of software layers that controls a configuration of the device and allows operations of the device according to the configuration.

Thus, in an embodiment, the device may send a request to a server (e.g., a layer information system may be a server that is remote from the device). The server may have knowledge about which operational mode is associated with the requesting device and therefore which operational mode the device should boot with (e.g., which layers should be used in the file system of the device). The operational mode may further have control over the configurations of each respective layer that is loaded into the file system.

In an embodiment, a layer information system (e.g., the server), may use a device identifier (e.g., IP address, identifier stored in memory of the device, an identifier entered into the device) to determine which operational mode the corresponding device should be booted into. Such association may be determined by using a lookup table, hash map, etc. Further, the determination regarding which operational mode is to be assigned to a device may be dependent on more than a device identifier. In some embodiments, determining the operational mode may additionally and/or alternatively rely on at least one of: a location of the device (coordinate level, state level, region level, country level, etc.), a time of day (e.g., a device may be used in a first operational mode between 8:00 AM to 9:00 PM and a second operational mode at other times), a day of the week, a date, how many devices are already in a first operational mode, the action that caused the device to begin the boot process (e.g., reboot, locally initiated boot, remotely initiated boot), etc.

The association between the device and an operational mode may be stored by the layer prescription unit. In an embodiment, the association may be modified using an interface (e.g., API, web interface, mobile app, command prompt, etc.). In an embodiment, authorized access is necessary to manage (e.g., add, update, and/or delete) associations between devices. Authorized access may be managed through authentication (e.g., passwords, biometrics, two-factor authentication, access cards, etc.). Associations may be managed by updating relationships among devices and device identifiers, operational modes, and/or other ways of assigning an operational mode to a device (e.g., location proximity, time, etc.).

At step 406, the device may receive from the layer information system (e.g., a remote server), an indication of the operational mode.

In an embodiment, the operational mode in which the device is to be operated is the same operational mode that the device was in after a previous boot-up process and the boot-up process is started each time the device is booted up.

At step 408, the device may determine a set of software layers corresponding to the operational mode that was received from the layer information system in step 406. In an embodiment, the device may determine the set of software layers by using at least a portion of the received operational mode indication. The indication may indicate the file system defined by assembling a set of software layers. The indication may include one or more layers for the file system. The indication may include a list as to what layers will be needed to be acquired by the device to include in the file system, the layers being acquired from the layer repository.

At step 410, the device may then assemble the set of software layers (e.g., software layers that have been received from the layer information system) to define a file system. The file system may contain only the layers that are necessary for an identified operational mode, the layers that are necessary for an identified operational mode may be a subset of all of the layers available within a layer repository where the layers were acquired from.

In an embodiment, the software layers are obtained from the layer information system each time the boot process is initiated, even if the device was previously booted with the same software layers. In an embodiment, one or more software layers that were loaded into the file system by the layer repository during a previous bootup and were retained by the file system. Thus, in the embodiment the layers still remain in the file system during a new boot process and may the operational mode assigned to the device (or another condition such as when (e.g., number of boots, days) the file system was last assembled from the layer repository, if a corresponding layer in the layer repository has been updated, etc.) may be used to determine whether to remove the layers from the file system and obtain new layers for the assigned operational mode.

It may be possible that the assembly of one or more software layers fails. Methods for dealing with such failures/errors are described further in method 500.

Figure 5:
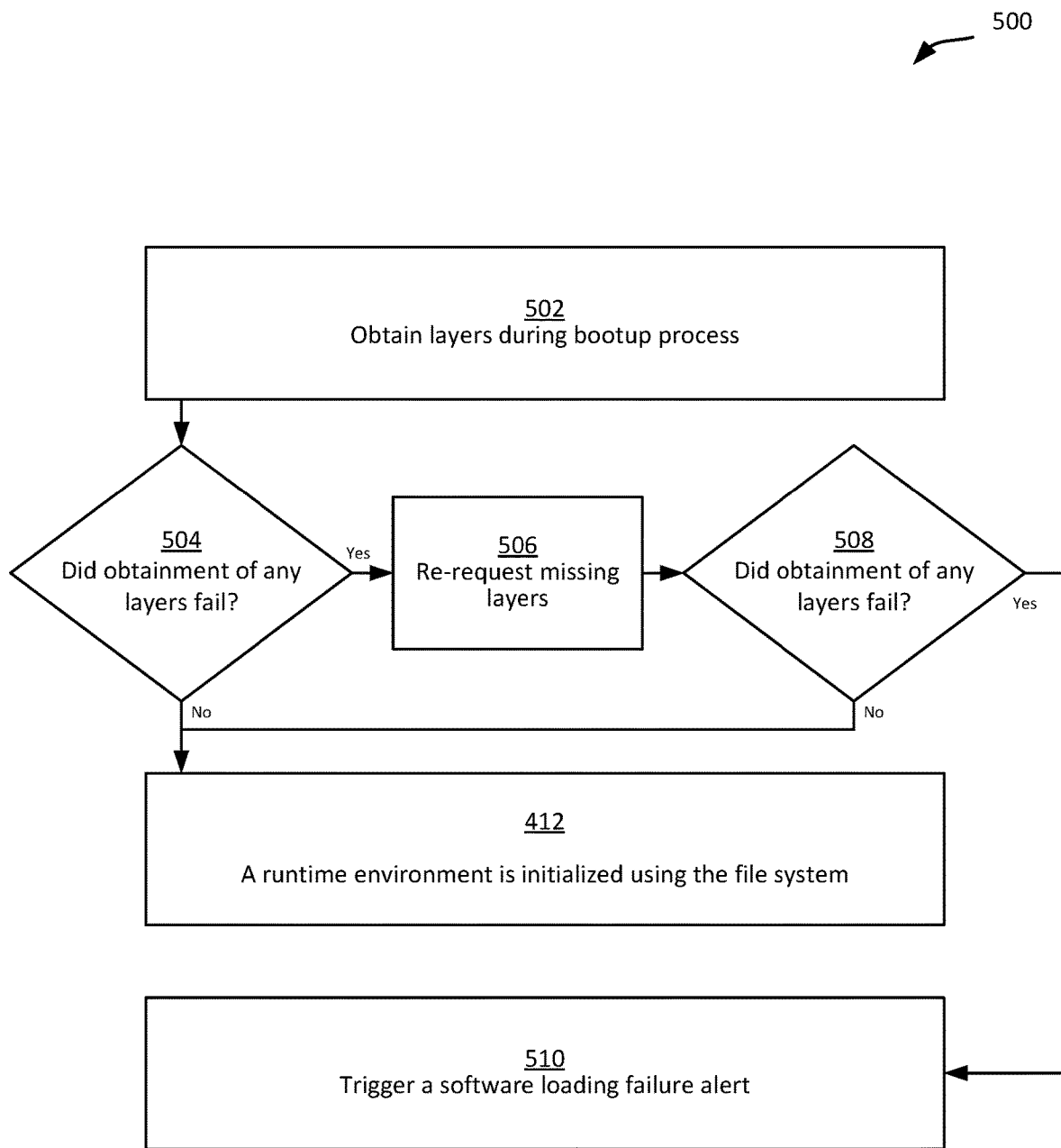
FIG. 5 illustrates a method of handling layer loading errors according to an embodiment of the present invention.

Briefly turning to method 500, FIG. 5 illustrates a method of handling layer loading errors according to an embodiment of the present invention.

At step 502, one or more layers may be being obtained sequentially or in parallel during the bootup process of the device. The layers may be being received from a layer information system and may be received after an operational mode has been indicated (e.g., by the layer prescription unit and/or input at the device).

At step 504, if receipt of any of the layers has failed (e.g., lost network connection to a remote server, hardware failure, thumb drive becomes unplugged, etc.) the layer that has failed to be received may be re-requested from the layer information system at step 506. In an embodiment, all layers received from the layer information system are removed from the file system and the process restarts.

At step 508, if one or more re-requested layers have again failed to be received from the layer information system, a software loading failure alert may be generated and transmitted at step 510. One of ordinary skill in the art, with the benefit of the present disclosure would realize that more than one attempt or no-retry attempts to re-obtain layers may be carried out, or other measures may be taken when trying to re-request layers from the layer information system.

At step 510, when a software loading failure is triggered, the generated and transmitted alert may cause a peripheral of the device to behave in a corresponding fashion. For example, a peripheral may flash, display a certain color of light, may display an error message, may make a particular sound, may send a message to another system that is accessible via a local or wide area network, or may cause some other output from the device that would allow a user to interpret that an error or software loading error has occurred.

At step 412, a runtime environment may be initialized using an acquired file system, such as a file system that was capable of being assembled for a corresponding operational mode using received layers from the layer information system. The runtime environment may be initialized once all layers have successfully been received from the layer information system. Step 412 of method 500 may correspond to step 412 of method 400.

Turning back to method 400, at step 412, a runtime environment that uses the file system is initialized. At this point, all of the layers may be obtained that are necessary for the identified operational mode and the device can finish the boot process so it may enter a runtime environment. The runtime environment may further configure the layers in the file system to further configure layer functionalities (e.g., responsive to another layer information system query for layer configuration information, responsive to information that was obtained in step 406 from a layer prescription unit). The layer functionality configuration may further configure a layer to behave in line with the operational mode (e.g., in some embodiments, a layer A may be used for two distinct operational modes, but the layer is functionally configured differently for each operational mode). Method 600, below, further describes methods of obtaining runtime functional configurations.

C. Runtime Software Configurations

After booting the system, each layer may be responsible for separate functionalities of the system. The functionalities may include software functionalities and/or hardware functionalities.

Figure 6:
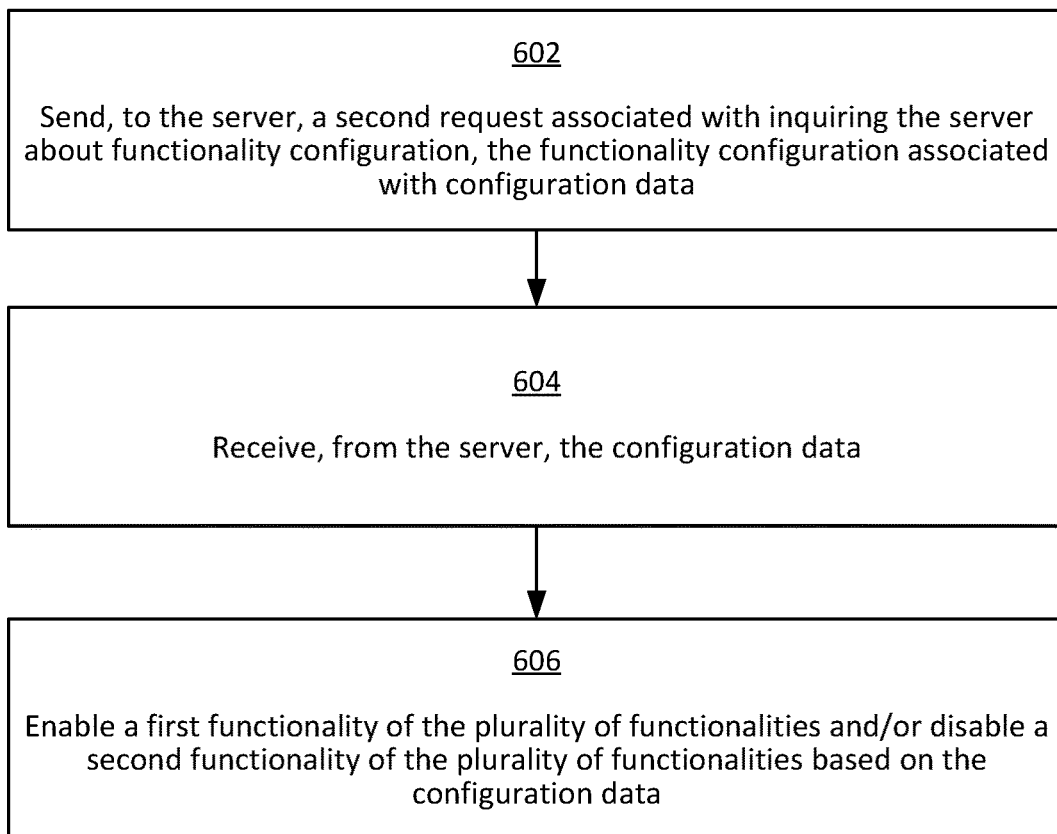
FIG. 6 illustrates a method of configuring layers at runtime, according to an embodiment of the present invention.

FIG. 6 illustrates a method of configuring layers at runtime, according to an embodiment of the present invention.

At step 602, a second request associated with inquiring the layer information system (e.g., a remote server) about functionality configuration may be sent to the layer information system, the functionality configuration may be associated with configuration data (e.g., configuration state)

and/or the assigned operational mode of the device. In an embodiment, the layer information system is distributed and therefore the second request may be sent to the layer prescription unit, which may be running on one or more machines that is different from the machine(s) the layer repository is operating on.

At step 604, the device may receive from the server, the configuration data. The configuration data may define a functional configuration for an intended operational mode of the device. In other words, the configuration data may allow for one or more assembled software layers to be configured according to the determined configuration state. Peripherals may also be moved relative to housing of the device in accordance with a configuration state. Such movement of peripherals is discussed in the Hardware Actions section below.

At step 606, the device may enable a first functionality of the plurality of functionalities and/or disable a second functionality of the plurality of functionalities based on the configuration data. The configuration may allow for granular control over the device such as allowing the configuration of each respective assembled layer and may cause hardware to be relatively moved to a position and/or cause software behavior to change (e.g., change of user interface elements, not allowing a peripheral to be successfully communicatively coupled with the processing unit of the device, etc.). Thus, as an example, the configuration data may cause a keyboard peripheral to be concealed or exposed. In an example, the configuration data may cause the same or a different keyboard to be exposed and keystrokes not to be detected by the processing unit, and therefore a device is not capable of processing interaction with one or more peripherals. The configuration data may also influence elements of a user interface of a peripheral with a screen, etc.

As an example, a device has completed a bootup process by determining an operational mode to boot with, obtaining the related layers from a layer repository, and entering a runtime environment. One such layer may be a first layer used for controlling a monitor. The device may then obtain runtime configuration information (e.g., by requesting the information from a layer information system) for the first layer. The configuration information may configure the monitor to display specific user interface elements, process particular input actions (e.g., double tap action, long press action) and/or move the monitor to a specific position. Thus, the first layer may allow for interfacing with the monitor, but the configuration information may allow for fine grain control of the capability to interface with the monitor.

Further detail regarding what conditions may cause hardware to move with respect to the device and/or function in a certain way are explained below, such as in the hardware actions section.

D. Example of Loading a File System Using Local Storage

Figure 7:
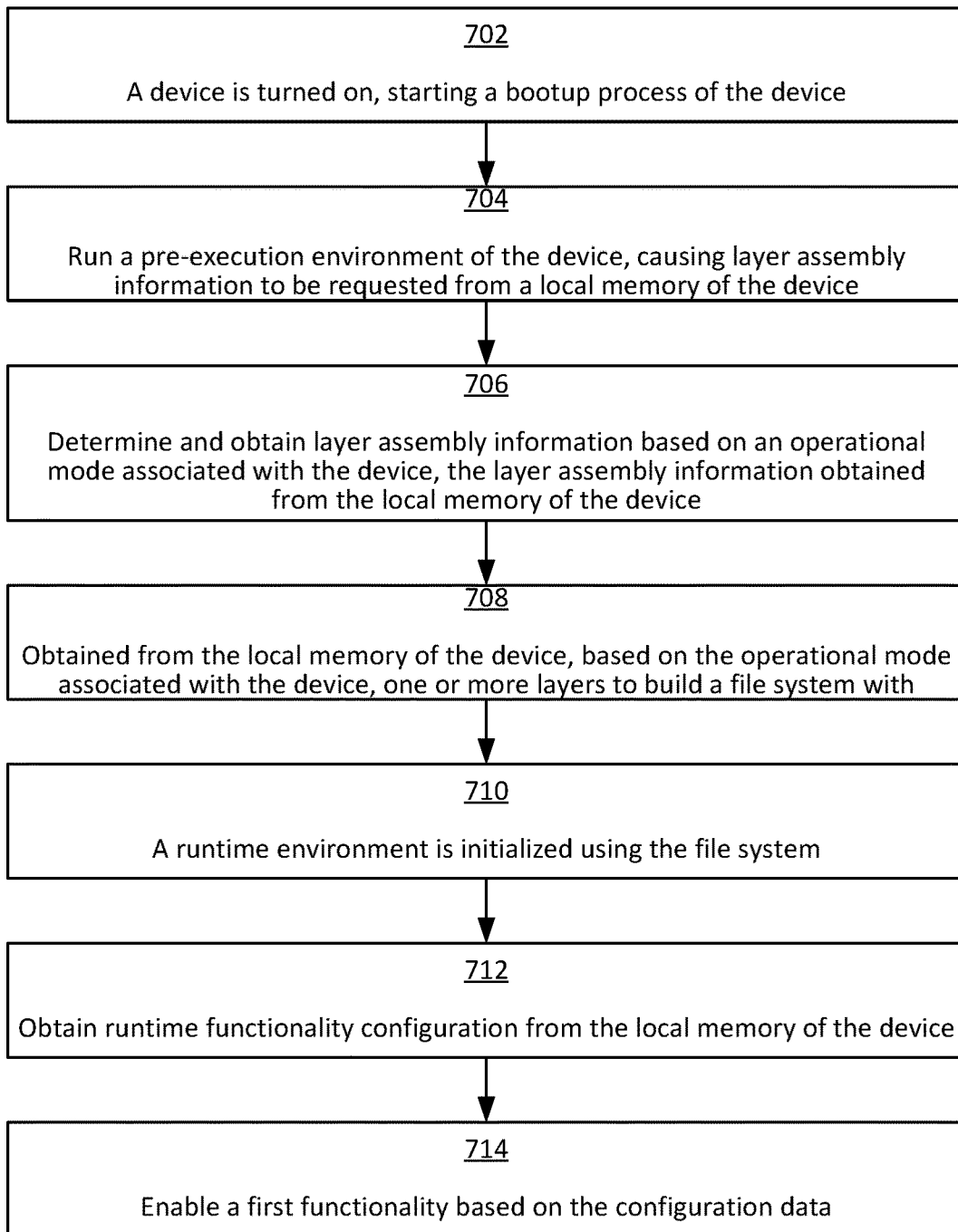
FIG. 7 illustrates an example of booting up and configuring a filesystem using layers stored locally, according to an embodiment of the present invention.

FIG. 7 illustrates an example of booting up and configuring a filesystem using layers stored locally, according to an embodiment of the present invention. Thus, in an embodiment, the layer repository and possibly the entire layer information system may be local to the device. In an embodiment, the layer information system is local to the device, stored in a memory location accessible to the processing unit without using a network connection (e.g., thumb drive, the same hard drive that the file system is stored on, a disk, etc.). Method 700 described an example embodiment where the layer information system is local to the device.

In embodiments where the layer information system is local to the device, the need for a network connection may be reduced or eliminated. Further, in embodiments where the layer information system is local to the device, the owner of the device may have more control over the layer within the layer information system and the operational modes of the device. In some cases, having the device capable of communicating with the layer information system locally (e.g., not over a network connection), the capability to securely build the file system may be enhanced.

At step 702, a device is turned on, starting a bootup process of the device. Methods of turning on the device have already been described above.

At step, 704, a pre-execution environment of the device's file system is run and may cause layer assembly information to be requested from the local memory of the device. As already described, the pre-execution environment may be stored in volatile or non-volatile memory of the device and may be obtained from local memory of the device or via a network call. In an embodiment, the layer assembly information is obtained from a layer prescription unit.

At step 706, the device may determine and obtain layer assembly information based on an operational mode associated with the device. The layer assembly information may be obtained from local memory of the device.

At step 708, one or more layers to be used in building a file system of the device may be obtained from local memory of the device based on the operational mode that is associated with the device. The one or more layers may be obtained from the layer repository in response to a request to the layer repository that was based on the layer assembly information and/or from the request of the layer assembly information.

At step 710, a runtime environment may be initialized using the file system. The runtime environment may be initialized using the layers received from the layer repository. Each layer in the layer repository may correspond to a distinct operational mode in an embodiment. In an embodiment, each layer in the layer repository may be used to build a file system that is corresponding to one or more operational modes.

At step 712, a runtime functionality configuration may be obtained from the layer information system that is within local memory of the device. The runtime functionality may allow for further configurations of one or more layers and may be done after the file system has been built and used to boot the device.

At step 714, a first functionality may be enabled based on the configuration data obtained in step 712. In an embodiment, a functionality may be disabled based on the configuration data.

Whether the file system of the device has been built with layers obtained locally or with the use of a network connection, methods are described below for removing the layers from the file system.

E. How The Software File System Life Cycle Affects the Hardware

During the lifecycle of a device, various morphing actions may take place to the software and/or hardware of the device. Therefore, during the shutdown process of the device and the bootup process of the device, software layers may be added and/or removed from the file system of the device. Further, during the shutdown process of the device and the bootup process of the device, the hardware may be caused to move relative to the device and/or may have memory altered.

Figure 8:
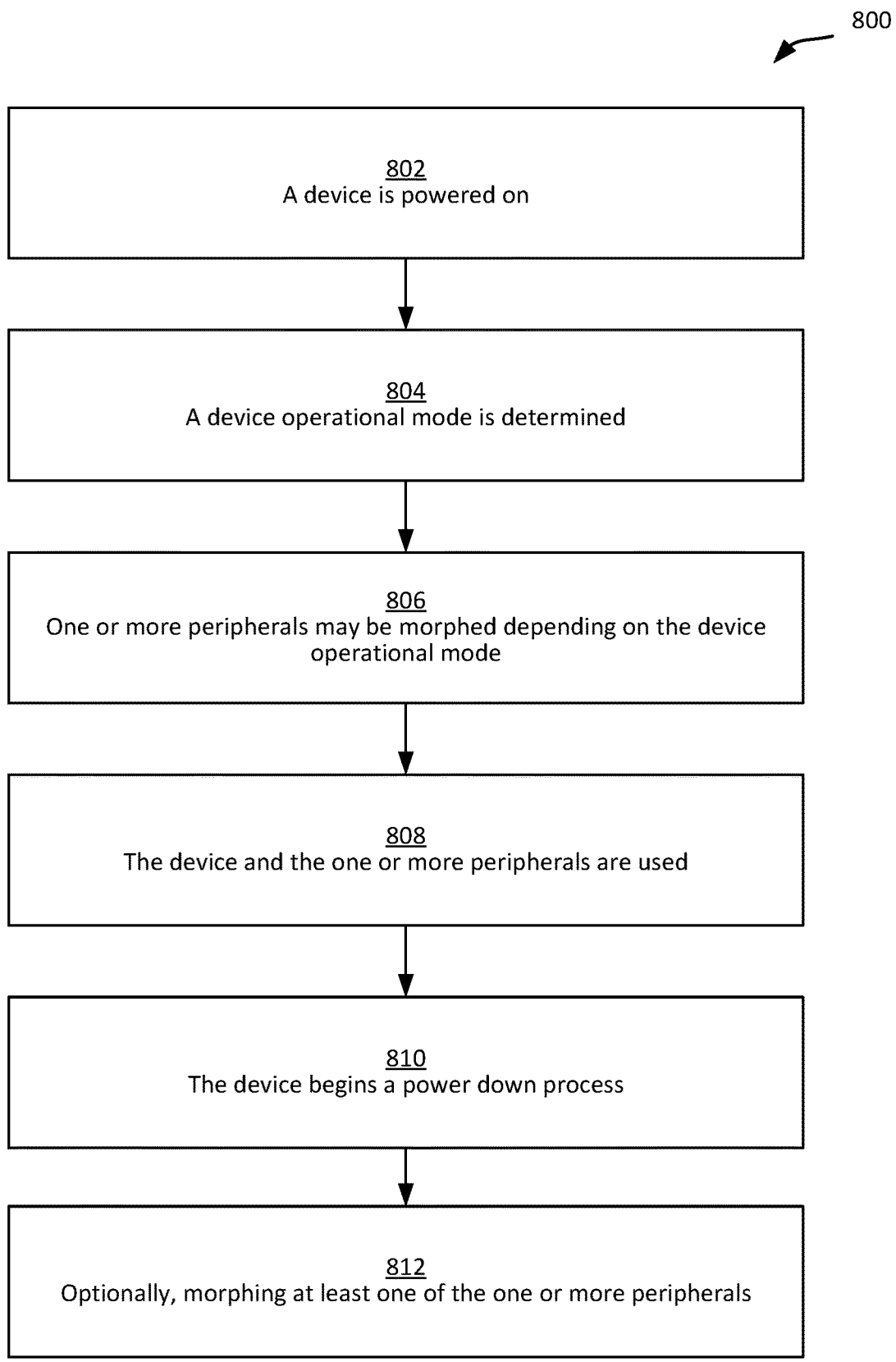
FIG. 8 illustrates physical morphing actions performed during bootup and runtime of a filesystem, according to an embodiment of the present invention.

FIG. 8 illustrates physical morphing actions performed during bootup and runtime of a filesystem, according to an embodiment of the present invention.

At step 802, a device is powered on. Embodiments for turning a device on have already been described (e.g., button press).

At step 804, a device operational mode is determined. The use of an operational mode and how it is obtained has already been described above.

At step, 806, one or more peripherals may be morphed depending on the device operational mode. Depending on the software layers that are loaded within a file system of a device, the processing unit of the device may determine that one or more peripherals should be moved to a different position relative to the housing of the device.

At step 808, the device and the one or more peripherals are used (e.g., by the user). The device may be fully booted and be executing a runtime environment of the operational mode of the device. At this point, the device may have all layers within the file system that were assigned to the operational mode at the time that the operational mode of the device was acquired by the device. The layers may remain within the file system at least until the device is shut down.

At step 810, the device shutdown process may begin. Such a process may begin for various reasons already described above (e.g., power button pressed). During the shutdown process, software layers may be effectively removed from the file system and/or one or more peripherals may be moved relative to the housing of the device. During a graceful shutdown, one or more layers may be removed from the file system before the device has completed the power down process. In the event of a non-graceful shutdown, it is possible that one or more layers that would have otherwise been removed (e.g., in the event of a graceful shutdown) remain in memory of the device after the device power down process finishes. In the case of a non-graceful shutdown, the processing unit (e.g., by instruction of the pre-execution environment) of the device may cause one or more layers to be removed from the file system before continuing with the bootup process (e.g., obtaining layer assembly information, obtaining one or more layers from a layer repository).

At step 812, at least one of the one or more peripherals may be morphed. Peripherals may be moved to a position that they were in before the machine was booted. Peripherals may remain in the same position they are at during the time of the shutdown being initiated. Peripherals may be moved to a different position relative to the housing of the device that they are in at the time that the shutdown process was initiated. The movement of a peripheral may be caused by a layer being effectively removed from the file system. In an embodiment, the movement of a peripheral may be caused by the shutdown process being initiated and before the layer is removed from the file system.

Further details of the physical morphing actions of the device are described in the hardware actions section below.

F. Removing Software/Layers/Modules from The File System

Aspects of software actions that take place during the shutdown process are described in more detail within method 900. Thus, steps 808 and 810 from method 800 are further described below, in example method 900.

Figure 9:
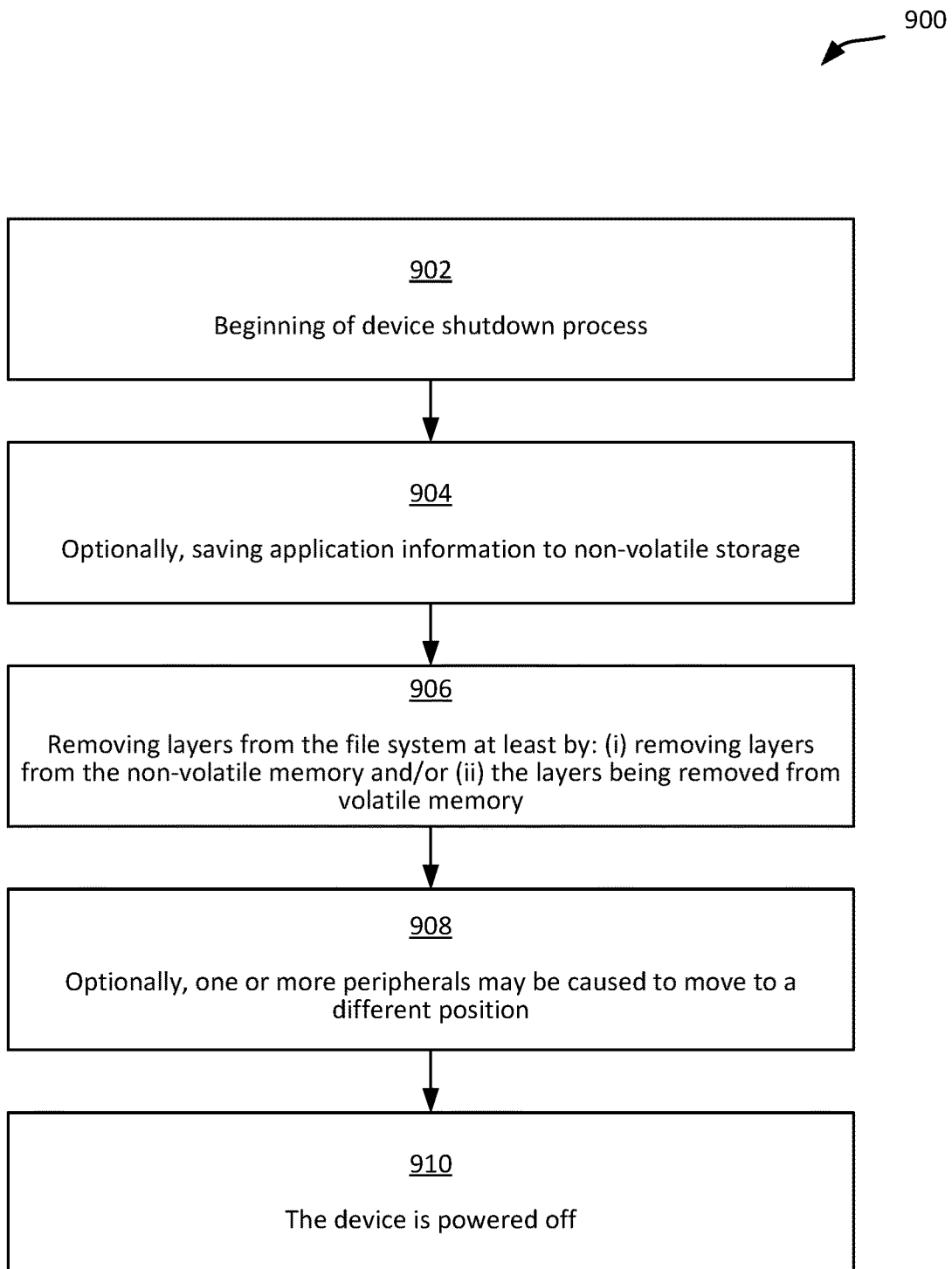
FIG. 9 illustrates a method of removing filesystem layers during a shutdown process of a device, according to an embodiment of the present invention.

FIG. 9 illustrates a method of removing filesystem layers during a shutdown process of a device, according to an embodiment of the present invention. A device that is being shutdown may have one or more layers within the file system that may have been obtained during the boot process of the device. Further, during the shutdown process, the process of removing layers may cause peripherals to be moved relative to the device. The boot process has been described above.

At step 902 (similar to step 810), a device shutdown process begins. The device shutdown process may begin due to a power button being pressed, an element of a user interface being clicked (e.g., shut off button on the user interface), the machine not receiving input (e.g., user input) for a set amount of time, an amount of time the machine has been on for, a specific time of day being reached, a reboot process beginning, instructions being received from a remote server (e.g., based on a schedule, input to the remote server), etc.

At step 904, application information may be saved to non-volatile storage. In an embodiment, data of one or more processes running on the machine during the time that the machine was being shut down, may be saved to non-volatile storage of the device so that it can be stored for retrieval at a later point in time (e.g., once the machine is booted into the same operational mode again). In an embodiment, if process data (e.g., application data) is saved to memory during shutdown, the saved data may be erased from memory of the device once a condition has been met (e.g., a certain date being reached, a certain amount of time passing, the device being booted into a different operational mode the next time that the device is booted, etc.)

At step 906, layers may be removed from the file system by at least: removing layers from nonvolatile memory of the device and/or removing layers from volatile memory of the device. In embodiments where non-volatile memory is used, all or some of the layers may be removed from the device. Layers could be removed by overwriting the corresponding data and/or by marking an area of memory as available in the file system's file structure so that the operating system no longer has the capability to access the pathway to the "removed" data.

Thus, in some embodiments, a device may be operating a runtime environment in a first operational mode, be shut down, and then carry out a boot process the next time is turned on to identify a second operational mode, and obtain and assemble layers for the second operational mode to initialize a runtime environment with (the second operational mode and layers may be different from the first operational mode and layers).

In some embodiments, the layers may be retained for subsequent boot up events of the device because saving the layers in the file system may be able to reduce the boot time for a subsequent boot into the same operational mode. In an embodiment where layers are retained for subsequent boot up events, a determination regarding the assigned operational mode of the device may be carried out during the subsequent bootup event(s) to determine if the assigned operational mode remains the same so that the layers may then be removed and other layers assembled, kept, partially removed (e.g., some layers are had in common and therefore do not need to be reloaded), etc.

In some embodiments, layers are moved from volatile memory to non-volatile memory during the shutdown of the device so that the layers may be retained for subsequent boot up events. In an embodiment, the pre-execution environment is not affected by the shutdown process and therefore does not get moved, deleted, or forgotten. In an embodiment, the pre-execution environment is stored within volatile memory of the device and therefore is removed once the device loses power. In an embodiment where one or more layers are not removed from file system memory or another memory of the device, a checksum may be run on the layers the next time that the device is booted with those retained layers in order to check information such as if the layers are the most current version and/or have an expected file structure.

It may be possible for a device to have a graceful shutdown or a non-graceful shutdown. During a graceful shutdown, one or more layers may be removed from the file system, as expected, based on instructions that are meant to execute before the device has completed the power down process. In the event of a non-graceful shutdown, it is possible that one or more layers that would have otherwise been removed (e.g., in the event of a graceful shutdown) remain in memory of the device after the device power down process finishes. In the case of a non-graceful shutdown, the processing unit (e.g., by instruction of the pre-execution environment, overwriting prior layers, etc.) of the device may cause one or more layers to be effectively removed and/or overwritten from the file system during a subsequent bootup process (e.g., before obtaining layer assembly information, before obtaining one or more layers from a layer repository). In an embodiment, one or more layers may be removed during the shutdown process of a device and one or more layers may be removed during the bootup process of the device. For example, some but not all layers may have been removed from the file system of the device during the shutdown process, by design or due to an ungraceful shutdown, and at least one of the one or more remaining layers may then be removed during the bootup process of the device.

At step 908 (similar to step 812), one or more peripherals may be moved to a different position. In an embodiment, when a device is carrying out a shutdown process, one or more peripherals of the device are caused to be moved relative to the device to be set into a default state that the peripherals are moved to upon every shutdown of the device. In an embodiment, one or more peripherals may stay in place when the shutdown process begins, such an embodiment may be useful because a device might be booted into the same operational mode the next time the device is turned on for use and therefore the system may be used more efficiently because the time to move peripherals is not needed if peripherals are already in place. In an embodiment peripherals may relatively move to a position based on the operational mode the device was operating in or how many times in a row the device has booted into the operational mode.

At step 910, the device is powered off because the shutdown process has been fully carried out. Once the device is turned back on, the boot process may begin again and layers will be loaded into the file system according to an operational mode assigned to the device.

Figure 10:
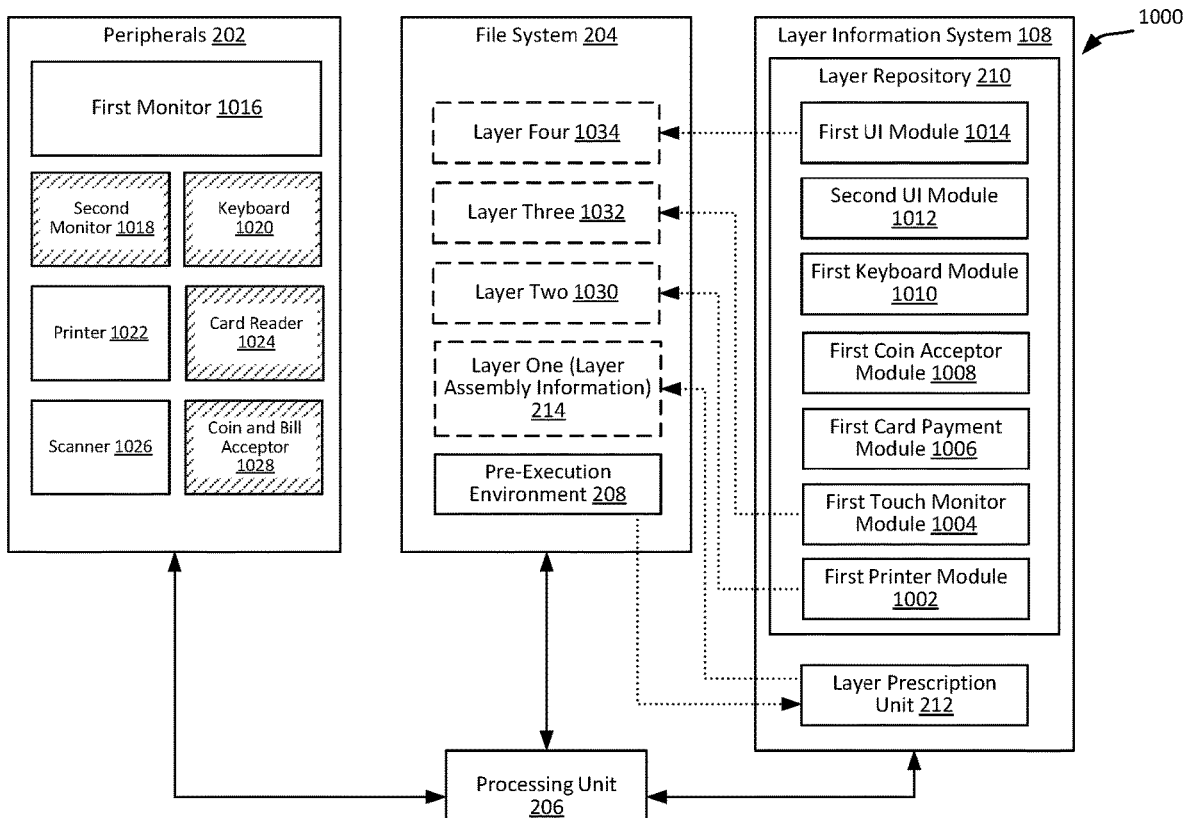
FIG. 10 illustrates an example configuration of a device when booted into an operational mode, according to an embodiment of the present invention.
Figure 11:
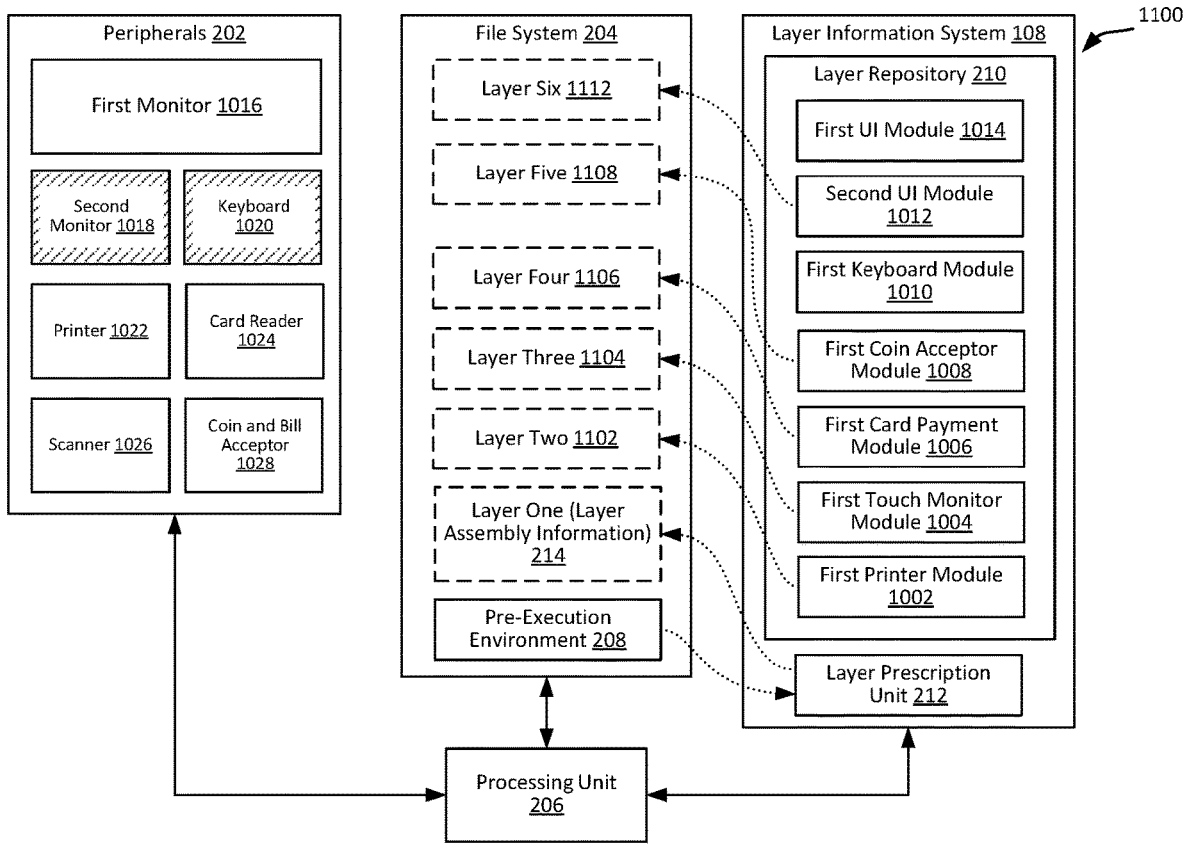
FIG. 11 illustrates an example configuration of a device when booted into an operational mode, according to an embodiment of the present invention.
Figure 12:
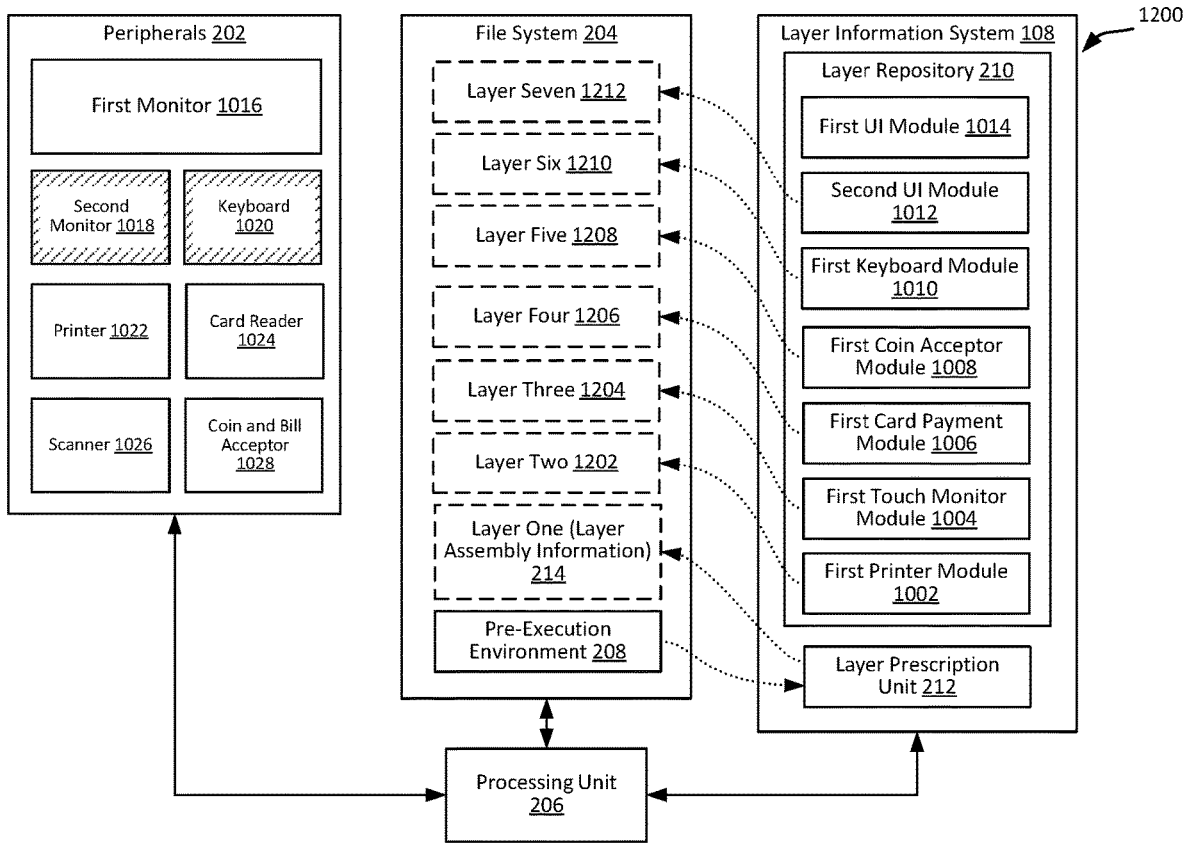
FIG. 12 illustrates an example configuration of a device when booted into an operational mode, according to an embodiment of the present invention.

G. Specific Examples of What Happens when Booting into Various Operational Modes FIGS. 10, 11, and 12 illustrate example embodiments of the invention and further explain how the file system may acquire layers from the layer information system and thereby cause peripherals to be configured accordingly. Systems 1000, 1100, and 1200 are only examples and are not an exhaustive list of operational modes a device may be assigned. Other operational modes would be obvious to one of ordinary skill in the art with the benefit of the present disclosure.

FIG. 10 illustrates an example configuration of a device when booted into an operational mode, according to an embodiment of the present invention.

System 1000 may be an example of a device being booted into an "Information Kiosk" mode. Aspect of booting a device into "Information Kiosk" mode may also be applied to boot the device into other modes.

In an example, an employee may turn on a device, such as by using a power button. After the device is powered on and the pre-execution environment 208 runs, the device determines that the operational mode that it should boot into is "Information Kiosk" mode. The device may determine the operational mode as a result of an indication from the layer prescription unit 212 (e.g., layer prescription unit 212 local to the device or remotely running on a server) or input at the device. The layer prescription unit 212 may cause a layer assembly information 214 layer to be created in the file system 204.

As a result of the device receiving the operational mode indication, the file system 204 of the device may progressively load relevant layers into the file system 204 of the device. Layers may be relevant because they are necessary to carry out functionalities of the indicated operational mode of the device. The loaded layers may control the physical hardware and software of the device (e.g., user-software interactions, software capabilities). The layers may be loaded into the file system 204 in parallel or in any order.

In the example embodiment of system 1000, a first printer module 1002 is loaded into the file system 204 from the layer repository 210 and is referenced as layer two 1030. Further, a first touch monitor module 1004 is loaded into the file system 204 from the layer repository 210 and is referenced as layer three 1032. Additionally, a first UI module 1014 is loaded into the file system 204 from the layer repository 210 and is referenced as layer four 1034.

Briefly, looking to the layer repository 210, although, there are seven layers within the layer repository 210, embodiments may contain fewer or more layers. Further, there is a first UI module 1014 and a second UI module 1012. Thus, it is possible that there is more than one layer in the layer repository 210 that relate to the same peripheral or to a similar software functionality. Further, a first UI module 1014 may be used with a first monitor 1016 in some embodiments and/or with a second monitor 1018 in some embodiments. In an embodiment, the first monitor 1016 may correspond to the first UI module 1014 being within the file system 204 according to a first operational mode and may correspond to a second UI module 1012 being within the file system 204 according to a second operational mode. Thus, layers/modules in the layer repository 210 may be used for one or more peripherals depending on the operational mode of the device.

Once one or more layers have been loaded into the file system 204, the layers are capable of configuring the device to function in accordance with the operational mode. In system 1000, layer one 214, the layer assembly information 214 layer, may be responsible for setting up a minimum viable common runtime for the further initialization of other software layers.

The first printer module 1002 loaded into layer two 1030 of the file system 204 may drive the printer 1022 peripheral, presence of the first printer module 1002 in the file system 204 may instruct initiation of the printer 1022 peripheral.

The first touch monitor module 1004 loaded into layer three 1032 may drive the first monitor 1016 (e.g., a touchscreen monitor) and enable display of contents on the first monitor 1016 and deliver signals to other software layers as a result of an interaction with the first monitor 1016 (e.g., touching the first monitor).

The first UI module 1014 loaded into layer four 1034 may allow for the first monitor 1016 to display UI elements related to the "Information Kiosk" mode.

The layers may also cause peripherals 202 to be moved relative to the housing of the device.

One or more of the layers loaded into the file system 204 (or the lack thereof), a combination the layers, and/or the operational mode of the device may cause the card reader 1024, the coin acceptor and bill acceptor 1028 not to function, the second monitor 1018 and the keyboard 1020 not to be operable. Such peripherals may not be operable because they are not accessible to a user (e.g., concealed within device housing, out of reach) and/or because the peripherals are not capable of processing interaction.

FIG. 11 illustrates an example configuration of a device when booted into an operational mode, according to an embodiment of the present invention.

System 1100 may be an example of a device being booted into a "Non-Assisted Business" mode. Aspects of booting a device into "Non-Assisted" Business mode may also be applied to boot the device into other modes.

In an example, an employee may turn on a device, such as by using a power button. After the device is powered on and the pre-execution environment 208 runs, the device determines that the operational mode that it should boot into is "Non-Assisted Business" mode. The device may determine the operational mode as a result of an indication from the layer prescription unit 212. The layer prescription unit 212 may cause a layer assembly information layer 214 to be created in the file system 204.

As a result of the device receiving the operational mode indication, the file system 204 of the device may progressively load relevant layers into the file system 204 of the device. Layers may be relevant because they are necessary to carry out functionalities of the indicated operational mode of the device. The loaded layers may control the physical hardware and software of the device (e.g., user-software interactions, software capabilities). The layers may be loaded into the file system 204 in parallel or in any order.

In the example embodiment of system 1100, a first printer module 1002 is loaded into the file system 204 from the layer repository 210 and is referenced as layer two 1102. Further, a first touch monitor module 1004 is loaded into the file system 204 from the layer repository 210 and is referenced as layer three 1104. Additionally, a first card payment module is loaded into the file system 204 from the layer repository 210 and is referenced as layer four 1106, a first coin acceptor module is loaded into the file system 204 from the layer repository 210 and is referenced as layer five 1108, and a second UI module is loaded into the file system 204 from the layer repository 210 and is referenced as layer six 1112.

Once one or more layers have been loaded into the file system 204, the layers are capable of configuring the device to function in accordance with the operational mode. In system 1100, layer one 214, the layer assembly information 214 layer, may be responsible for setting up a minimum viable common runtime for the further initialization of other software layers.

The first printer module 1002 loaded into layer two 1102 of the file system 204 may drive the printer 1022 peripheral, presence of the first printer model in the file system 204 may instruct initiation of the printer 1022 peripheral.

The first touch monitor module 1004 loaded into layer three 1104 of the file system 204 may drive the first monitor 1016 (e.g., a touchscreen monitor) and enable display of contents on the first monitor 1016 and deliver signals to other software layers as a result of an interaction with the first monitor 1016 (e.g., touching the first monitor).

The first card payment module 1006 loaded into layer four 1106 of the file system 204 may be used to enable the card reader 1024 peripheral to communicate with the processing unit 206 and therefore successfully transmit interaction operations.

The first coin acceptor module 1008 loaded into layer five 1108 of the file system 204 may be used to communicate with the coin and bill acceptor 1028 peripheral and enable the coin and bill acceptor 1028 peripheral to command and control interactions with the peripheral.

The second UI module 1012 loaded into layer six 1112 of the file system 204 may drive the interactions with the ensemble of peripherals 202 and the flows of using the peripherals 202 with the device. Further, layer six 1112 may additionally render graphical content on the first monitor 1016.

Thus, in "Non-Assisted Business" mode, like with other operational modes, each layer may be responsible for individual functionality of both physical movements of peripherals relative to the housing of the device and/or the software interactions that peripherals are capable of having with the processing unit.

FIG. 12 illustrates an example configuration of a device when booted into an operational mode, according to an embodiment of the present invention.

System 1200 may be an example of a device being booted into an "Assisted Business" mode. Aspect of booting a device into "Assisted Business" mode may also be applied to boot the device into other modes.

In an example, an employee may turn on a device, such as by using a power button. After the device is powered on and the pre-execution environment runs, the device determines that the operational mode that it should boot into is "Assisted Business" mode. The device may determine the operational mode as a result of an indication from the layer prescription unit 212. The layer prescription unit 212 may cause a layer assembly information layer to be created in the file system 204.

As a result of the device receiving the operational mode indication, the file system 204 of the device may progressively load relevant layers into the file system 204 of the device. Layers may be relevant because they are necessary to carry out functionalities of the indicated operational mode of the device. The loaded layers may control the physical hardware and software of the device (e.g., user-software interactions, software capabilities). The layers may be loaded into the file system 204 in parallel or in any order.

In the example embodiment of system 1200, a first printer module 1002 is loaded into the file system 204 from the layer repository 210 and is referenced as layer two 1202. Further, a first touch monitor module 1004 is loaded into the file system 204 from the layer repository 210 and is referenced as layer three 1204. Additionally, a first card payment module 1006 is loaded into the file system 204 from the layer repository 210 and is referenced as layer four 1206, a first coin acceptor module 1008 is loaded into the file system 204 from the layer repository 210 and is referenced as layer five 1208, a first keyboard module 1010 is loaded into the file system 204 from the layer repository 210 and referenced as layer six 1210, and a second UI module 1012 is loaded into the file system 204 from the layer repository 210 and is referenced as layer seven 1212.

Once one or more layers have been loaded into the file system 204, the layers are capable of configuring the device to function in accordance with the operational mode. In system 1200, layer one 214, the layer assembly information 214 layer, may be responsible for setting up a minimum viable common runtime for the further initialization of other software layers.

The first printer module 1002 loaded into layer two 1202 of the file system 204 may drive the printer 1022 peripheral, presence of the first printer module 1002 in the file system 204 may instruct initiation of the printer 1022 peripheral.

The first touch monitor module 1004 loaded into layer three 1204 of the file system 204 may drive the first monitor 1016 (e.g., a touchscreen monitor) and enable display of contents on the first monitor 1016 and deliver signals to other software layers as a result of an interaction with the first monitor 1016 (e.g., touching the first monitor).

The first card payment module 1006 loaded into layer four 1206 of the file system 204 may be used to enable the card reader 1024 peripheral to communicate with the processing unit 206 and therefore successfully transmit interaction operations.

The first coin acceptor module 1008 loaded into layer five 1208 of the file system 204 may be used to communicate with the coin and bill acceptor 1028 peripheral and enable the coin and bill acceptor 1028 peripheral to command and control interactions with the peripheral.

The first keyboard module 1010 loaded into layer six 1210 may cause the keyboard 1020 peripheral to move relative to the housing of the device (e.g., extend out from the device housing) and to illuminate. As such, interaction with the keyboard 1020 may be allowed and indicated as such.

The second UI module 1012 loaded into layer seven of the file system 204 may drive the interactions with the ensemble of peripherals and the flows of using the peripherals with the device. Further, layer seven may additionally render graphical content on the first monitor.

Thus, in "Assisted Business" mode, like with other operational modes, each layer may be responsible for individual functionality of both physical movements of peripherals relative to the housing of the device and/or the software interactions that peripherals are capable of having with the processing unit.

Further details, in addition to those already covered, regarding hardware morphing and actions of hardware peripherals are described in further detail below.

II. Hardware Behavior

As already mentioned above, peripherals of a device may be caused to move as a result of one or more layers that have been loaded into the file system of the device. Once a determination has been made to move peripherals relative to the housing of the device, hardware may be moved by actuators (e.g., motor) or other similar mechanisms that are capable of causing the peripherals to move relative to the device housing.

A. Device Hardware System

Figure 13:
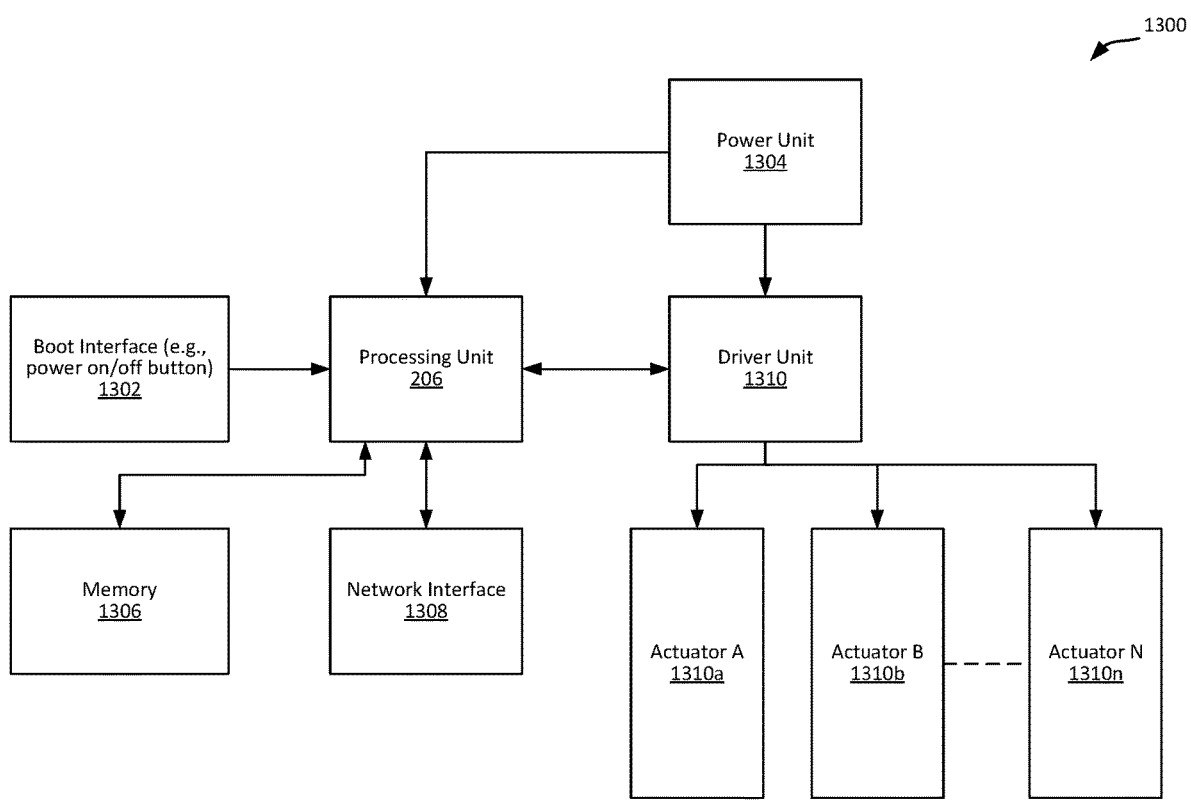
FIG. 13 illustrates a system according to an embodiment of the present invention.

FIG. 13 illustrates a system according to an embodiment of the present invention. System 1300 includes a boot interface 1302, a processing unit 206, a memory 1306, a network interface 1308, a power unit 1304, a driver unit 1310, and one or more actuators (as shown by actuator A 1310a, actuator B 1310b, through actuator N 1310n). The system may be representative of a device, according to embodiments of the present invention.

The boot interface 1302 allow for the device to be turned on so that it may then determine which operational mode to operate within and/or to perform a bootup process with as described above in the software actions section. The boot interface 1302 may be a button on the device. The boot interface 1302 may be a button on a different device or a UI element on a different device. Further, the boot interface 1302 may also be a switch or other similar component that would allow for a signal to be interpreted by the device to begin a bootup process. Thus, a boot interface may include a peripheral (e.g., hardware peripheral) that allows initiating (e.g., by a user) the booting up of the device, wherein initiating the booting up causes a request to be sent by the device to a server to determine the operational mode for the device.

The processing unit 206 may begin operating once the bootup process of the device beings after the boot interface 1302 has triggered the bootup process of the device. The processing unit 206 may be communicatively coupled with a memory 1306 of the device, a network interface 1308 of the device, and/or one or more driver units 1310 of the device. The processing unit 206 may also be coupled with a power unit 1304 of the device. The components that the processing unit 206 is coupled to may allow for the device to obtain an operational mode, load layers into a file system in accordance with the operational mode, move peripherals relative to a housing of the device, and create a runtime environment for the device which allows the device to be used (e.g., by one or more users) in accordance with the operational mode used to boot the device. The processing unit 206 may execute instructions after the device has been booted (e.g., once all layers indicated by the operational mode have been loaded into the file system) and send instructions to the driver unit 1310, which may cause the driver unit 1310 to move one or more peripherals by causing one or more actuators (e.g., actuator A 1310a) to move. Once peripherals are in the desired position for a respective operational mode that is being booted into, the compute unit 206 may software initialize the peripherals so that they will be accordingly available for interaction.

The device will include a power unit 1304. The power unit 1304 would be needed to allow the processing unit 206 to operate. Further a power unit 1304 may be needed to operate actuators and/or other components of the device (such as the network interface 1308). The power unit 1304 may be a battery. The power may be obtained by the device via a wireless interface (e.g., using induction). The power may be obtained by the device via the device being plugged into an outlet (e.g., wall outlet, floor outlet, power strip etc.). As would be obvious, there may be one or more power units for the device. Therefore, it may be that actuators of a device are powered with a power unit 1304 that is separate from the power unit used by other device components, in an embodiment. In an embodiment, an actuator may obtain power from a power unit 1304 that is different from a power unit 1304 that is connected to a different actuator.

As already discussed in the software actions section, the memory 1306 may be used to store the layer information system locally on the device. Further the memory 1306 may be used to store layers of the file system within. The file system layers allow the device to adopt an operational mode and use modules from the layer information system (local or remote to the device) to carry out operations associated with the operational mode that is associated with the device. Layers of the file system may be acquired during the boot up of the device to establish a file system for an indicated operational mode. The layers in the file system may indicate which peripherals should be morphed (e.g., physically morphed as to be moved relative to the device). In an embodiment the memory 1306 may be non-volatile memory. In an embodiment, the memory 1306 is a combination of volatile memory and non-volatile memory. Volatile memory may be useful for removing software layers from the file system during shutdown. Non-volatile memory may be useful for preserving one or more layers or process data before shutdown of the device.

The device may include a network interface 1308. The network interface 1308 may be used by the device to conduct transactions, search for items, display information (e.g., to users), transmit information (e.g., to users), etc. Further, the network interface 1308 may be used to communicate with a layer information system and/or a layer repository that is remote from the device.

The device may include a driver unit 1310. The driver unit 1310 may control and monitor the relative movement of one or more peripherals. The driver unit 1310 may be capable of driving multiple actuators, thus orchestrating the movement of multiple peripherals. The driver unit 1310 may receive instructions from the processing unit for controlling the actuators. Further, the driver unit 1310 may transmit information to the processing unit 206 regarding the position of peripherals and/or movement of actuators. The driver unit 1310 may translate morphing instructions from the processing unit 206 into voltage signals which may then be used to activate a corresponding actuator.

The device may include one or more actuators. (e.g., actuator A 1310*a*) As mentioned above, the driver unit 1310 may be used to control one or more actuators. The actuators are therefore used to move peripherals relative to the device housing. The actuators may be capable of moving a peripheral (e.g., by moving a peripheral mounting structure) and/or be capable of moving a casing of a peripheral (e.g., a "sliding door" to hide or show a peripheral). In an embodiment, once all of the actuators have moved peripherals to a desired position, the driver unit 1310 will then signal the compute unit 206 that the desired morphing has been completed.

Peripherals, whether movable with respect to the housing of the device or not, may be any one of, or a combination of the following non-exhaustive list of peripherals: a keyboard, a touchscreen, a button, dial, a number pad, a coin recycler, a coin vendor, a coin acceptor, a bill recycler, a bill vendor, a bill acceptor, a signature capture device, a PIN entry device, an NFC reader, a cash drawer, a card reader, a barcode scanner, a QR code scanner, a monitor, a speaker, a check reader, a microphone, a camera, a receipt printer, a display pole, or a light.

A method of moving peripherals using a driver unit 1310 and an actuator is further discussed below in methods 1400 and 1500.

B. Process for Operational Mode-Specific Hardware Setup

As described, peripherals may be moved to a position depending on the operational mode of a device and therefore dependent on the layers within the file system of the device.

Figure 14:
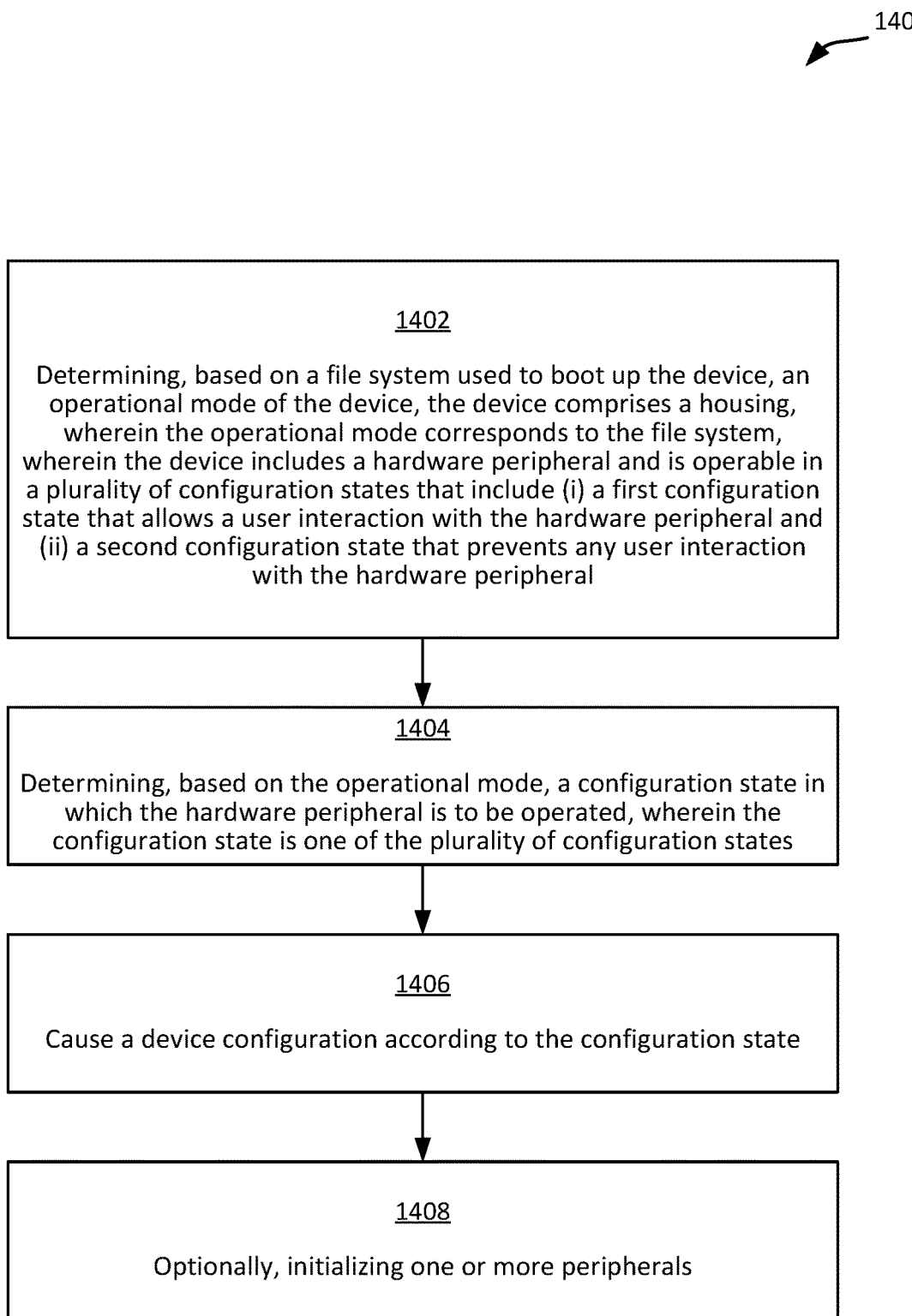
FIG. 14 illustrates a method of morphing a device according to an embodiment of the present invention.

FIG. 14 illustrates a method of morphing a device according to an embodiment of the present invention.

At step 1402, based on a file system used to boot up a device, an operational mode of the device is determined, the device may comprise a housing, and the operational mode of the device may correspond to the file system. The file system may indicate an operational mode of the device due to the combination of layers included therein and/or information included within one or more layers included within the file system. The device may include a hardware peripheral and may be operable in a plurality of configuration states that include a first configuration state that allows an interaction with the hardware peripheral and a second configuration state that prevents any interaction with the hardware peripheral.

In an embodiment, a configuration state (e.g., second configuration state) within the plurality of configuration states prevents at least one of: a physical interaction (e.g., user interaction) with the hardware peripheral, or the processor from processing interaction (e.g., user interaction) data corresponding to a physical interaction with the hardware peripheral.

In an embodiment, the configuration state (e.g., first configuration state, second configuration state) within the plurality of configuration states causes a relative movement between the hardware peripheral and the housing, and wherein the relative movement includes at least one of: retracting the hardware peripheral into the housing, covering the hardware peripheral by another component included in the housing, physically moving the hardware peripheral to a first position, be extended from the housing of the device, be uncovered, or presenting a set of user interface elements with the peripheral.

In an embodiment, the configuration state (e.g., second configuration state) within the plurality of configuration states causes a hardware peripheral to at least: physically move to a position, move relative to the housing, or presents a set of user interface elements.

At step 1404, a determination may be made based on the operational mode, as to a configuration state in which the hardware peripheral is to be operated, wherein the configuration state is one of the plurality of configuration states. A configuration state may correspond to a position that a respective peripheral should be at relative to the device housing. Additional detail regarding moving respective peripherals to a proper position relative to the device housing is described within method 1500.

At step 1406, a device configuration is caused according to the configuration state.

In an embodiment, the configuration of the device may include a relative movement between the hardware peripheral and the housing, the relative movement occurring after the booting up of the device. In an embodiment, the configuration of the device may include a software configuration of the device, the software configuration updating a user interface of the hardware peripheral to present a set of elements (e.g., lights, sounds).

At step 1408, one or more peripherals may be initialized. After a peripheral is initialized, it may be ready (e.g., in position, capable of having input processed, and/or capable of successfully communicating with the processing unit) to be interfaced with.

Figure 15:
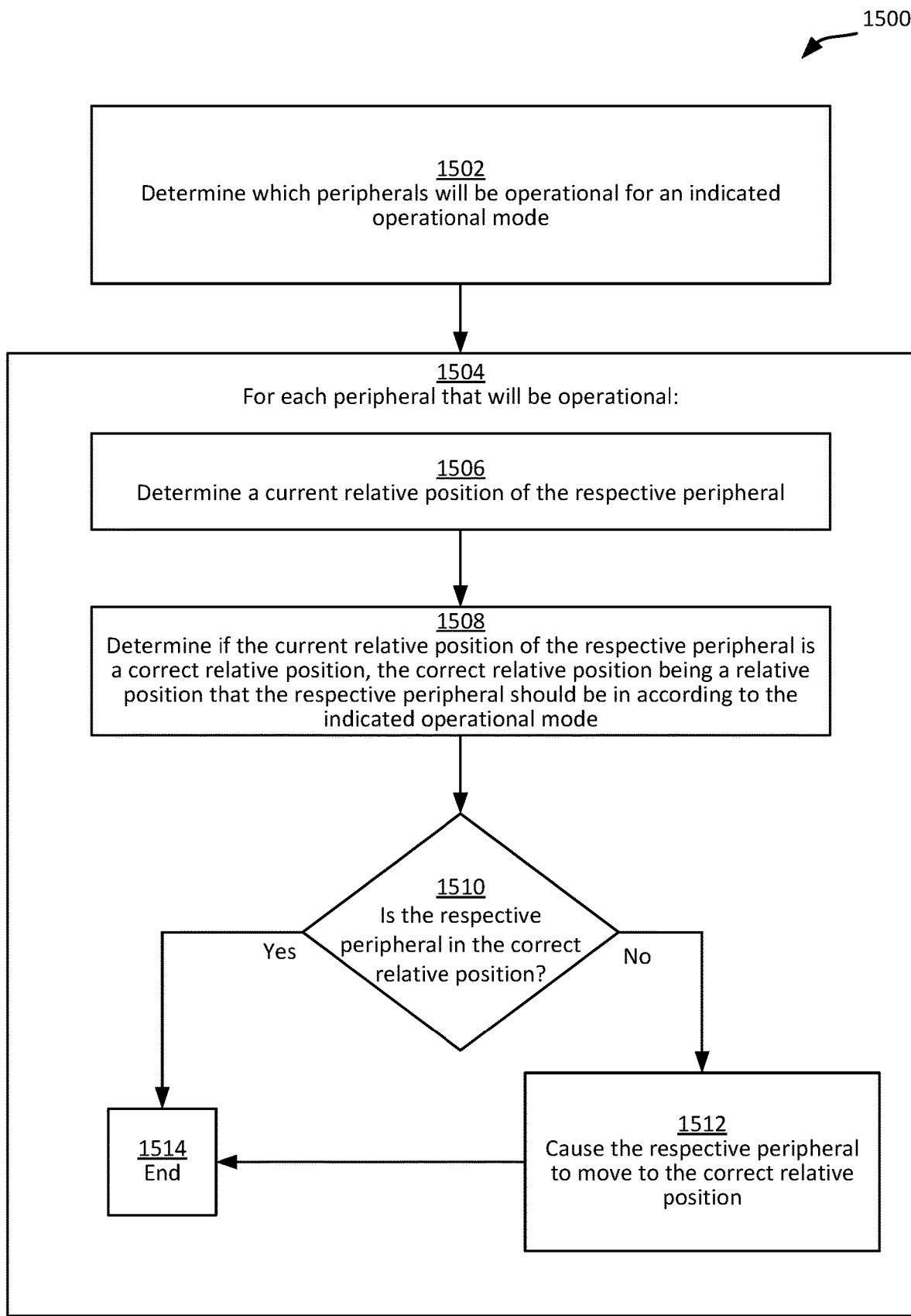
FIG. 15 illustrates a method for moving peripherals relative to a housing based on an indicated operational mode according to an embodiment of the present invention.

FIG. 15 illustrates a method for moving peripherals relative to a housing based on an indicated operational mode according to an embodiment of the present invention. Thus, method 1500 may be used to carry out morphing instructions once an operational mode is indicated and a bootup into the operational mode has been completed.

At step 1502, a determination may be made regarding which peripherals will be operational for an indicated operational mode. Such a determination may be carried out because not all peripherals may be used in each possible operational mode. For example, a keyboard peripheral may be used in a first operational mode but not in a second operational mode. Thus, the determination as to whether said keyboard (or other peripheral) should be moved according to the operational mode that was booted with may be carried out at step 1502.

Step 1504 represents how each peripheral may be moved independent of other peripherals in an embodiment. Thus, in an embodiment, for each peripheral, a desired position may be determined, whether the respective peripheral is in the desired position, and moving the peripheral relative to the housing if necessary.

At step 1506, a current relative position of the respective peripheral is determined. The processing unit may be able to obtain the current relative position of the respective peripheral through the position of the peripheral being previously stored in memory (e.g., based on last known position, based on a default boot position, based on a signal received from the driver unit since the boot process begun).

At step 1508, a determination of whether the current relative position of the respective peripheral is a correct relative position, the correct relative position being a relative position that the respective peripheral should be in according to the indicated operational mode. In an embodiment where the peripheral is not capable of moving relative to the housing, the peripheral may always be determined to be in the correct position.

At step 1510, a determination is made to check if the respective peripheral is in the correct relative position.

If the respective peripheral is at in/at the correct relative position for the operational mode the device has booted into then the method proceeds to step 1514 where the method of positioning the respective peripheral ends. Once all respective peripherals have been determined to be in the correct relative position, then the method of relatively moving each peripheral has been completed.

If the respective peripheral is not in the correct relative position, the peripheral is caused to be moved to the correct relative position. As already described, an actuator or similar component may be used to cause the respective peripheral to move relative to the housing to be placed into the correct position. Once the peripheral is within the correct position, step 1514 is carried out as already described above. Method 1600 discusses a method for addressing failures of one or more peripherals to be moved into the correct position.

Figure 16:
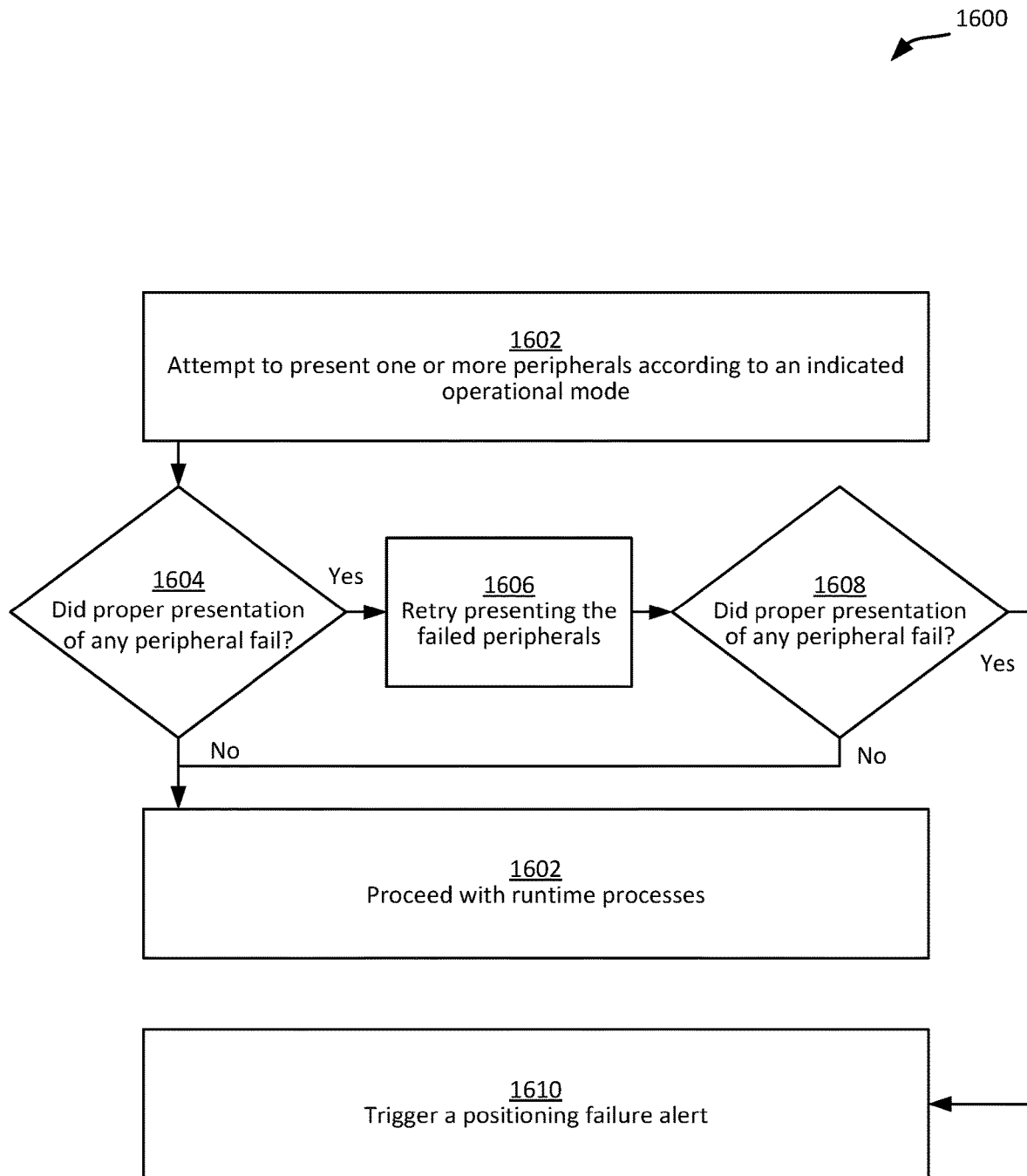
FIG. 16 illustrates a method of handling peripheral positioning errors according to an embodiment of the present invention.

Method 1600 is similar to method 500, used for determining if any layers were filed to be correctly obtained by the file system. However, method 1600 is directed to errors with peripheral relative movement instead of software failures. FIG. 16 illustrates a method of handling peripheral positioning errors according to an embodiment of the present invention.

At step 1602, one or more peripherals are attempted to be presented according to an indicated operational mode. Thus, step 1602 may correspond to step 1512 of method 1500 when a peripheral is attempted to be moved to the correct peripheral position according to an operational mode.

At step 1604, a determination is made regarding whether the proper presentation of any peripheral failed. Thus, a determination may be made regarding whether any peripheral has failed to move to the correct position for the operational mode of the device. In an example, a peripheral may have failed to properly present due to a hardware failure of the actuator, or like component. Further, in an example, a peripheral may have failed to properly present due to the respective actuator, drive unit, or other component not receiving power. In an example, positioning may fail due to a corrupted portion of memory within the layers (in an embodiment, this may be fixed by rebooting the machine to re-obtain the layer from the layer repository that has not been corrupted). In an example, positioning may fail due to an obstruction (e.g., an object is preventing the peripheral from moving into the correct position).

In an embodiment where, the respective peripheral has been correctly positioned, the method may proceed to step 1602, where the execution of the runtime environment continues.

In another case where the respective peripheral has been indicated at step 1604 as not being correctly positioned. Method 1600 may proceed to step 1606. At step 1606, the processing unit may attempt to instruct the drive unit to retry presenting the failed peripheral(s) in the correct position. When retrying to present the peripheral in the correct position, the device may completely reboot, try to move away from the correct position and then back toward the correct position, may exert more force, may moving the peripheral in a different path (if multiple axis of movement is possible), etc. Further, in an embodiment, the step of retrying to correctly position a peripheral may repeat more than one time or not occur.

In method 1600, if proper presentation of the peripheral still fails after retrying to correctly position the peripheral, step 1608 may cause the method to proceed to step 1610. If retrying to cause the peripheral to be relatively moved into the correct position was successful, the method 1600 may proceed to step 1602. Step 1602 has been described above.

At step 1610, if the device is unsuccessful in correctly positioning the peripheral, after possibly retrying to do so, a positioning alert failure may be generated. In an embodiment, when a positioning failure alert is triggered, the generated and transmitted alert may cause a peripheral of the device to behave in a corresponding fashion. For example, a peripheral may flash, display a certain color of light, may display an error message, may make a particular sound, may send a message to another system that is accessible via a local or wide area network, or may cause some other output from the device that would allow a user to interpret that an error or software loading error has occurred.

Specific example of how the peripherals of a device may be positioned relative to the device are illustrated in figures that are described below.

C. Specific Examples of Operational Mode-Specific Device Configuration Through Hardware Morphing Just as specific examples of operational modes were described at the end of the software actions section above, specific examples of how peripherals may be affected by an operational mode are described below.

FIGS. 17A-D and 18A-D illustrate an example change in peripheral positioning when booted into an operational mode, according to an embodiment of the present invention. FIGS. 17A-D may represent a first viewpoint of a device as it morphs into an "Information Kiosk" mode. FIGS. 18A-D may represent a second viewpoint of the same device as it morphs into the "Information Kiosk" mode. Example movement of the device peripherals is shown through the progression of FIGS. 17A-D and 18A-D.

FIGS. 17A and 18A illustrates a device (e.g., retail environment device) that includes a light 1702, a first monitor 1704, a card payment device 1706, a printer 1708, a scanner 1710, a bill vendor 1712, and a coin acceptor 1714, a second monitor 1802, and a keyboard 1804. In an embodiment, FIGS. 17A and 18A may correspond to a default device position that the device is set to upon every shutdown of the device. In an embodiment, FIGS. 17A and 18A may correspond to the most recent operational mode that the device was booted/morphed into. Thus, FIGS. 17A and 18A may represent a device configuration when the device is turned off and directly after it is turned on to begin a boot process. FIGS. 17A-D and 18A-D may represent the snapshots in time of what the device may look like from the first viewpoint as the device physically morphs into a physical state which is consistent with the operational mode, such as "Information Kiosk" mode. Therefore, the same peripherals shown in FIG. 17A are also included in FIG. 17B-D, but may not be visible due to the physical morphing of the device.

As an example, when the device in FIG. 17A-D is powered on, a boot process is initiated, and the device receives an indication the operational mode assigned to the device. The indication of the operational mode assigned to the device causes the device to load relevant layers into a file system from a layer repository. The layers may relate to the peripherals which may be used in the assigned operational mode. Using the file system (e.g., layers loaded within), the desired morphing instruction may be computed by a processing unit of the device once the boot process has been completed (e.g., layers corresponding to the operational mode have been loaded into the file system). The processing unit may transmit morphing instructions for one or more peripherals to a drive unit, the drive unit using the instructions to cause actuators to move a peripheral (e.g., using a voltage signal to activate the actuator(s)).

The instructions generated by the processing unit may instruct that a shutter should be moved to close off the bill vendor 1712 and coin acceptor 1714 from interaction, that the card payment device 1716 is retracted into the housing of the device, that a second monitor 1802 is retracted into the housing of a device, and/or that a keyboard 1804 is retracted into the device. Such movement, relative to the device housing, is illustrated within FIGS. 17A-D and 18A-D.

Once one or more peripherals reach the positions that correspond to the assigned device operational mode, the processing unit may proceed to initialize the peripherals. For example, the first monitor 1704 may display content on the touchscreen that corresponds to the assigned operational mode of the device, the scanner 1710 may be capable of having the processing unit process interaction with the scanner 1710, the printer 1708 may be capable of receiving instructions from the processing unit (e.g., activate lights of the printer, print), and/or the light 1702 is activated to thereby indicate that the device is operational.

In an embodiment, once one or more peripherals reach the positions that correspond to the assigned device operational mode the scanner 1710 may have a status light activated to indicate the scanner is operational, a speaker may make a sounds, one or more peripherals may illuminate, etc. One of ordinary skill in the art, with the benefit of the present disclosure, would realize that there are many ways that a device could communicate to a user that one or more peripherals have been initialized and/or that the device is ready for being used in accordance with the corresponding operational mode.

Figure 19A:
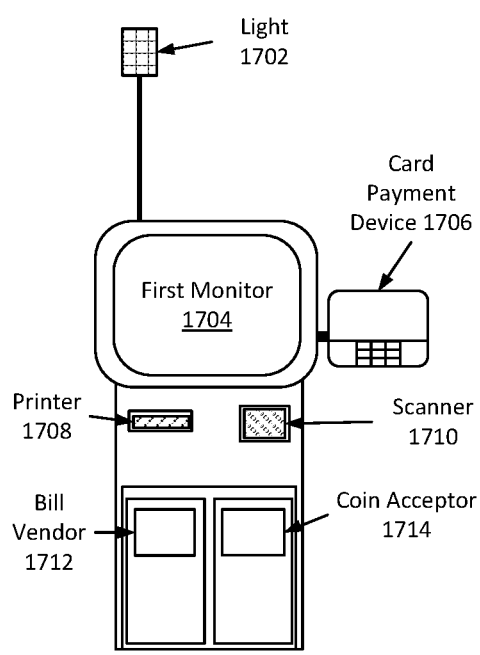
FIGS. 19A-B illustrate an example peripheral positioning when booted into an operational mode, according to an embodiment of the present invention.
Figure 19B:
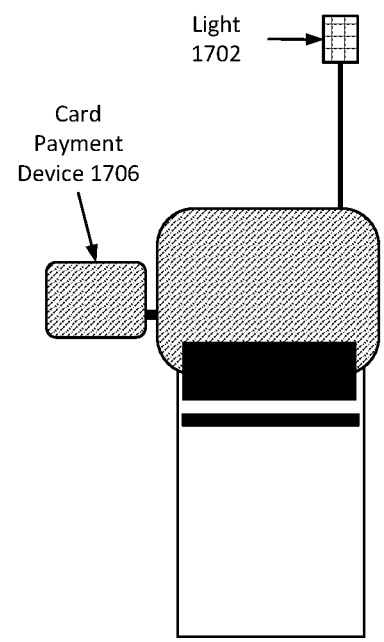

FIGS. 19A-B illustrate an example peripheral positioning when booted into an operational mode, according to an embodiment of the present invention. FIGS. 19A-D are similar to FIGS. 17A-D and 18A-D, however, only the final morphing results (e.g., FIGS. 17D and 18D, 19A, 19B) is illustrated for two viewpoints of the same device. Methods and systems already described above explain when, how, and why morphing of a device takes place.

FIGS. 19A and 19B may serve as an example of a device that is in an operational mode such as a "Non-Assisted Business" mode. In the "Non-Assisted Business" mode, payment peripherals (e.g., card payment device 1706, bill vendor 1712, coin acceptor 1714) may be required to be presented for interaction, and a single first monitor 1704 (e.g., a touch monitor) may be used (the touch monitor may be capable of presenting a keyboard on the screen). Further, a printer 1708 and/or a scanner 1710 may be required to be operational for receiving input and/or output information.

After a device is powered on and the boot process completes, peripherals may be caused to move to a position in accordance with the operational mode of the device (e.g., "Non-Assisted Business" mode). As illustrated in FIGS. 19A and 19B, the first monitor 1704, the card payment device 1706, the bill vendor 1712, and coin acceptor 1714 may be accessible to a user. Further, a second monitor 1802 and a keyboard 1804 may be concealed. In an embodiment, the second monitor 1802 and/or the keyboard 1804 is not concealed, but the processing unit of the device is not capable of processing their respective inputs. In an embodiment, the "Non-Assisted Business" mode may be associated with a device when the device is to be used by a customer as a self-checkout device.

Such peripheral positioning relative to the housing of the device may be carried out by a actuators being used to extend or retract components (e.g., peripheral mounts, peripheral covers, etc.).

FIGS. 20A-B illustrate an example peripheral positioning when booted into an operational mode, according to an embodiment of the present invention. FIGS. 20A and 20B are similar to FIGS. 19A and 19B in that sense that they illustrate two viewpoints of the same device. However, the peripheral positioning in FIGS. 20A and 20B is different from 19A and 19B (e.g., due to the operational mode assigned to the device). FIGS. 20A and 20B may represent the positioning of peripherals that may occur when a device is associated with an "Assisted Business" mode. In an embodiment, the "Assisted Business" mode may be associated with a device when the device is intended be used by an employee and a customer during a checkout process of a customer (e.g., employee rings items up and the customer waits and pays).

In the "Assisted Business" mode, the first monitor 1704 and second monitor 1802 may be used, along with the card payment device 1706, the bill vendor 1712, the coin acceptor 1714, the light 1702, the second monitor 1802, and the keyboard 1804. For example, an employee of a retail store may assist on the checkout of a customer by using the second monitor 1802 and the keyboard 1804 while the customer completes part of the checkout process using the one or more payment peripherals (e.g., card payment device 1706, bill vendor 1712, coin acceptor 1714, printer 1708, scanner 1710), and the first monitor 1704. Further, in an embodiment, the light 1702 may indicate that a device is operational or may specifically indicate the operational mode that the device is within (e.g., blue light indicates "Non-Assisted" business mode and white light indicates "Assisted Business" mode).

III. Computer System

Figure 21:
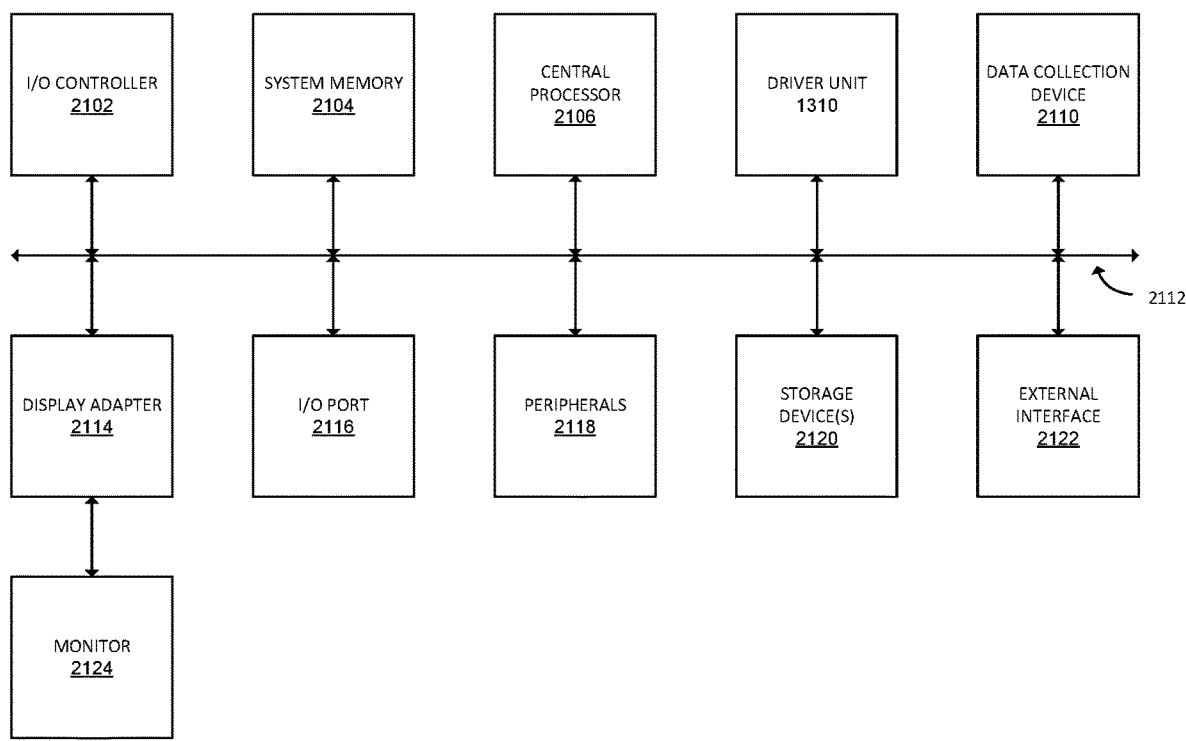
FIG. 21 illustrates an example computer system, according to an embodiment of the present invention.

Any of the computer systems mentioned herein may utilize any suitable number of subsystems. Examples of such subsystems are shown in FIG. 21 in computer system 2100. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in system 2100 are interconnected via a system bus 2112. Additional subsystems such peripherals 2118 (e.g., a printer, a keyboard), storage device(s) 2120, monitor 2124 (e.g., a display screen, such as an LED), which is coupled to display adapter 2114, Driver Unit 1310, and others are shown. Peripherals 2118 and input/output (I/O) devices, which couple to I/O controller 2102, can be connected to the computer system by any number of means known in the art such as input/output (I/O) port 2116 (e.g., USB, FireWire®). As such, in an embodiment, peripherals 2118 may be connected to the system bus 2112 via an input/output (I/O) port 2116. For example, I/O port 2116 or external interface 2122 (e.g., Ethernet, Wi-Fi, etc.) can be used to connect computer system 2100 to a wide area network such as the Internet, a mouse input device, or a scanner. The interconnection via system bus 2112 allows the central processor 2106 to communicate with each subsystem and to control the execution of a plurality of instructions from system memory 2104 or the storage device(s) 2120 (e.g., a fixed disk, such as a hard drive, or optical disk), as well as the exchange of information between subsystems. The system memory 2104 and/or the storage device(s) 2120 may embody a computer readable medium. Another subsystem is a data collection device 2110, such as a camera, microphone, accelerometer, bar code scanner, and the like. Any of the data mentioned herein can be output from one component to another component and can be output to the user.

A computer system can include a plurality of the same components or subsystems (e.g., connected by external interface 2122), by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned above are herein incorporated by reference in their entirety for all purposes. None is admitted to be prior art.

What is claimed is:

1. A device configured to be located in a retail environment, the device comprising:
   a housing;
   a hardware peripheral coupled to the housing and being operable in a plurality of configuration states that include (i) a first configuration state that allows a physical user interaction with the hardware peripheral and (ii) a second configuration state that prevents any physical user interaction with the hardware peripheral;
   one or more processors; and
   one or more memory storing instructions that, upon execution by the one or more processors, configure the device to:
      determine, based on a file system used to boot up the device, an operational mode of the device, wherein the operational mode corresponds to the file system and is unchangeable until a subsequent boot up of the device;
      determine, based on the operational mode, a configuration state in which the hardware peripheral is to be operated, wherein the configuration state is one of the plurality of configuration states; and
      cause a device configuration according to the configuration state.

2. The device of claim 1, wherein the device configuration includes a relative movement between the hardware peripheral and the housing, the relative movement occurring after the booting up of the device.

3. The device of claim 1, wherein the second configuration state prevents the one or more processors from processing user interaction data corresponding to a physical interaction with the hardware peripheral.

4. The device of claim 1, wherein the configuration state is the second configuration state, the second configuration state enables the device configuration to cause a relative movement between the hardware peripheral and the housing, and wherein the relative movement includes at least one of: retracting the hardware peripheral into the housing, covering the hardware peripheral by another component included in the housing, or physically moving the hardware peripheral to a first position.

5. The device of claim 1, wherein according to the configuration state, the hardware peripheral at least: physically moves to a position, moves relative to the housing, or presents a set of user interface elements.

6. The device of claim 1, wherein based on the operational mode, the hardware peripheral is moved using an actuator, and the hardware peripheral includes at least one of: a keyboard, a touchscreen, a button, dial, a number pad, a coin recycler, a coin vendor, a coin acceptor, a bill recycler, a bill vendor, a bill acceptor, a signature capture device, a PIN entry device, an NFC reader, a cash drawer, a card reader, a barcode scanner, a QR code scanner, a monitor, a speaker, a check reader, a microphone, a camera, a receipt printer, a display pole, or a light.

7. The device of claim 1, wherein the device configuration includes a software configuration of the device, the software configuration updating a user interface of the hardware peripheral to present a set of elements.

8. A system configured to operate in a retail environment, the system comprising:
   one or more storage media configured to store computer-executable instructions; and
   one or more processors configured to access the one or more storage media and execute the computer-executable instructions to at least:
      determine, based on a file system used to boot up a device, an operational mode of the device, the device comprises a housing, wherein the operational mode corresponds to the file system and the operational mode is unchangeable until a subsequent boot up of the device, wherein the device includes a hardware peripheral and is operable in a plurality of configuration states that include (i) a first configuration state that allows a physical user interaction with the hardware peripheral and (ii) a second configuration state that prevents any physical user interaction with the hardware peripheral;
      determine, based on the operational mode, a configuration state in which the hardware peripheral is to be operated, wherein the configuration state is one of the plurality of configuration states; and
      cause a device configuration according to the configuration state.

9. The system of claim 8, wherein the file system used to boot up the device is selected from a plurality of file systems.

10. The system of claim 8, wherein the second configuration state prevents the one or more processors from processing user interaction data corresponding to a physical interaction with the hardware peripheral.

11. The system of claim 8, wherein the configuration state is the second configuration state, the second configuration state causes a relative movement between the hardware peripheral and the housing, and wherein the relative movement includes at least one of: retracting the hardware peripheral into the housing, covering the hardware peripheral by another component included in the housing, or physically moving the hardware peripheral to a first position.

12. The system of claim 8, wherein according to the configuration state, the hardware peripheral at least: physically moves to a position, moves relative to the housing, or presents a set of user interface elements.

13. The system of claim 8, wherein based on the operational mode, the hardware peripheral is moved using an actuator, and the hardware peripheral includes at least one of: a keyboard, a touchscreen, a button, dial, a number pad, a coin recycler, a coin vendor, a coin acceptor, a bill recycler, a bill vendor, a bill acceptor, a signature capture device, a PIN entry device, an NFC reader, a cash drawer, a card reader, a barcode scanner, a QR code scanner, a monitor, a speaker, a check reader, a microphone, a camera, a receipt printer, a display pole, or a light.

14. The system of claim 8, further comprising a second hardware peripheral that allows a user to initiate the booting up of the device, wherein initiating the booting up causes a request to be sent by the device to a server to determine the operational mode.

15. A method of morphing a device, the device configured to be located in a retail environment, the method comprising:
   determining, based on a file system used to boot up the device, an operational mode of the device, the device comprises a housing, wherein the operational mode corresponds to the file system and the operational mode is unchangeable until a subsequent boot up of the device, wherein the device includes a hardware peripheral and is operable in a plurality of configuration states that include (i) a first configuration state that allows a physical user interaction with the hardware peripheral and (ii) a second configuration state that prevents any physical user interaction with the hardware peripheral;

determining, based on the operational mode, a configuration state in which the hardware peripheral is to be operated, wherein the configuration state is one of the plurality of configuration states; and cause a device configuration according to the configuration state.

16. The method of claim 15, wherein the device configuration includes a relative movement between the hardware peripheral and the housing, the relative movement occurring after the booting up of the device.

17. The method of claim 15, wherein the configuration state is the second configuration state, the second configuration state causes a relative movement between the hardware peripheral and the housing, and wherein the relative movement includes at least one of: retracting the hardware peripheral into the housing, covering the hardware peripheral by another component included in the housing, or physically moving the hardware peripheral to a first position.

18. The method of claim 15, wherein the operational mode is a single operational mode the device operates within after bootup and the configuration state is a single configuration state the device operates within after booting up.

19. The method of claim 15, further comprising a second hardware peripheral that allows a user to initiate the booting up of the device, wherein initiating the booting up causes a request to be sent by the device to a server to determine the operational mode.

20. The method of claim 15, wherein the configuration state enables the device configuration to cause moving the hardware peripheral from a first position relative to the housing to a second position relative to the housing, the second position different from the first position.

* * * * *